United States Patent
Burley et al.

[15] 3,689,734
[45] Sept. 5, 1972

[54] PROGRAMMED CONTROL SYSTEM

[72] Inventors: Richard Kenneth Burley; Robert Friedman, both of Reseda; Howard D. Lesher, Canoga Park, all of Calif.

[73] Assignee: North American Rockwell Corporation,

[22] Filed: March 4, 1969

[21] Appl. No.: 804,251

[52] U.S. Cl.................................219/131 R, 307/260
[51] Int. Cl. ...............................................B23k 9/10
[58] Field of Search .219/130, 131; 321/18; 307/260, 307/265

[56] References Cited

UNITED STATES PATENTS

| | | | |
|---|---|---|---|
| 3,343,063 | 9/1967 | Keeney, Jr. et al. | ......321/18 X |
| 3,351,838 | 11/1967 | Hunter | ......................321/18 X |
| 3,360,683 | 12/1967 | Inoue | ......................219/131 X |
| 3,461,374 | 8/1969 | Rhyne, Jr. | ....................321/18 |
| 3,465,236 | 9/1969 | James | ....................307/265 X |

Primary Examiner—C. L. Albritton
Attorney—William R. Lane, Thomas S. MacDonald and Allan Rothenberg

[57] ABSTRACT

A programmed welding system is described which automatically controls weld current, electrode travel rate, and weld duration time in an orbital type welder. Each program is carried on a single card bearing a number of resistors of which each controls one of the various parameters that is peculiar to the chosen program. A closed-loop modular transistorized power supply controlled by pulse width modulation is disclosed together with a combination of high frequency and impulse starting and precision pulse width modulation closed-loop control of electrode travel rate. All actions for a single weld operation are automatically controlled by the group of resistors on a selected program card. The operator, to perform a complete weld, need only select the desired program and operate the start switch.

16 Claims, 31 Drawing Figures

INVENTORS.
RICHARD K. BURLEY
HOWARD D. LESHER
BY  ROBERT FRIEDMAN

Thomas S. MacDonald

ATTORNEY

INVENTORS.
RICHARD K. BURLEY
HOWARD D. LESHER
ROBERT FRIEDMAN
BY Thomas S. MacDonald
ATTORNEY

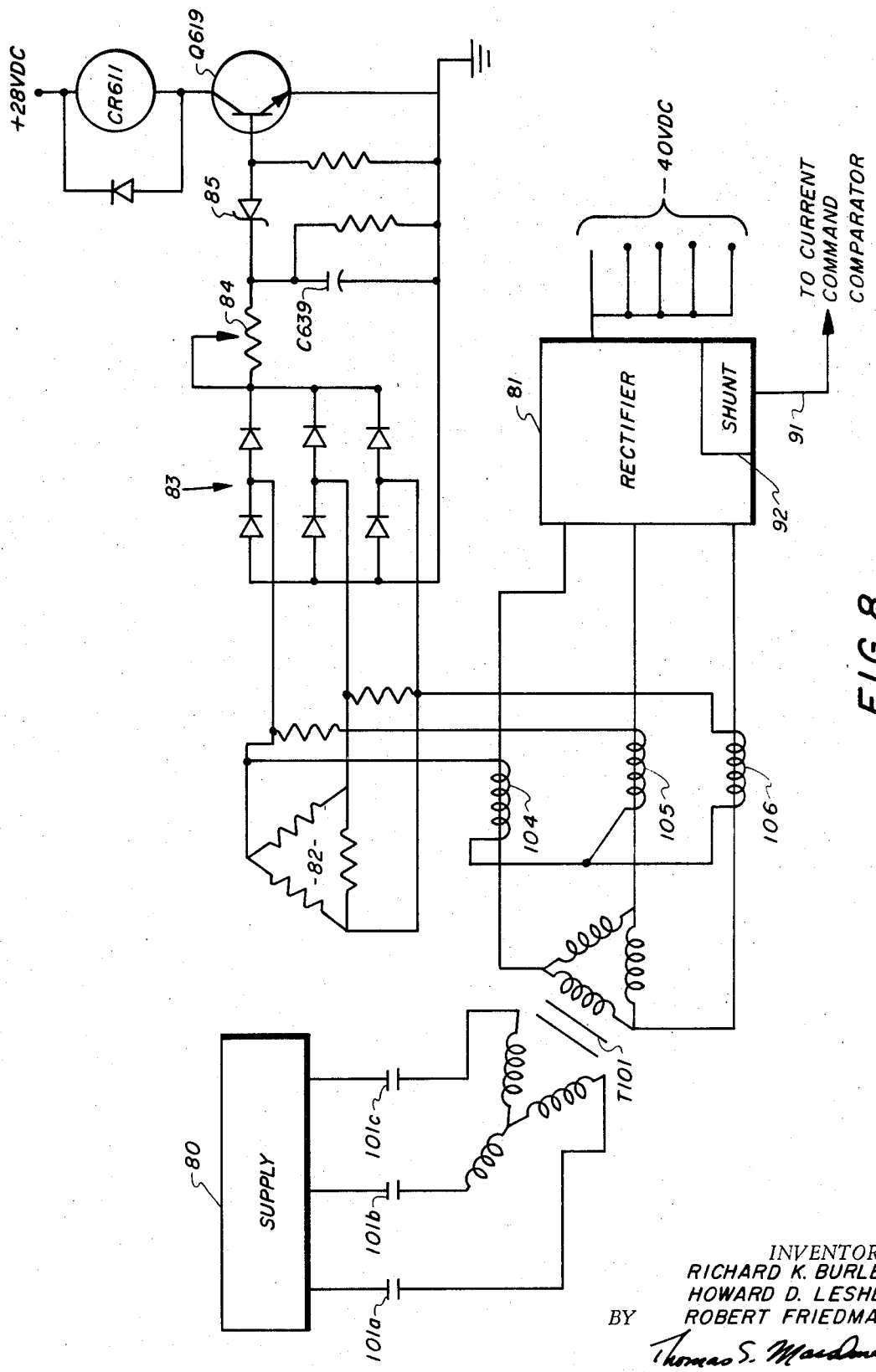

INVENTORS.
RICHARD K. BURLEY
HOWARD D. LESHER
ROBERT FRIEDMAN
BY Thomas S. MacDonald
ATTORNEY

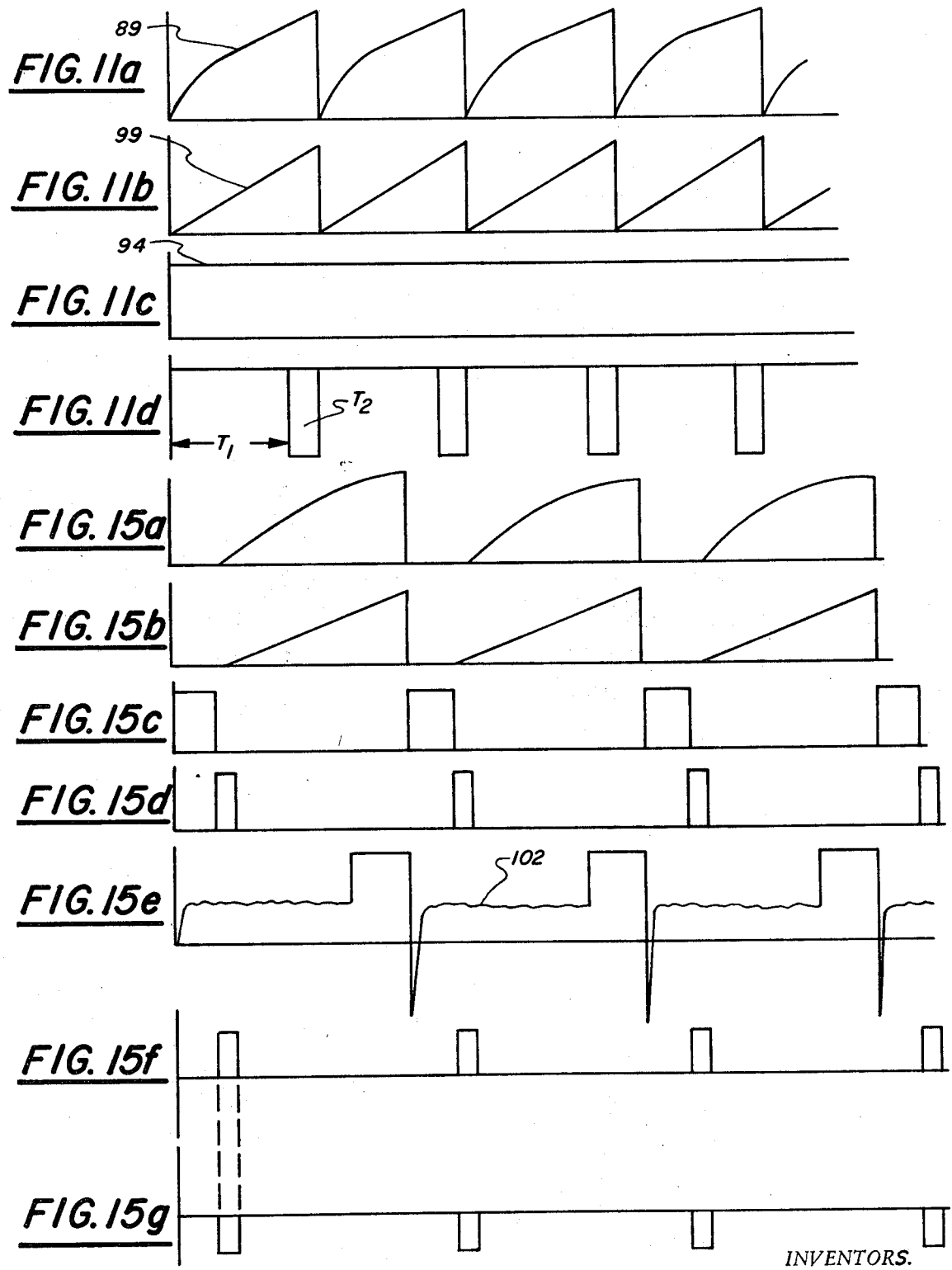

INVENTORS.
RICHARD K. BURLEY
HOWARD D. LESHER
BY ROBERT FRIEDMAN

ATTORNEY

INVENTORS.
RICHARD K. BURLEY
HOWARD D. LESHER
BY ROBERT FRIEDMAN

Thomas S. MacDonald
ATTORNEY

PROGRAMMED CONTROL SYSTEM

BACKGROUND OF THE INVENTION

The increasingly stringent requirements and specifications for weld control and precision, particularly in the aerospace field, have significantly expanded the need for automatic welding equipment in which variations due to human errors are eliminated. In addition the need for constant reproducibility of weld quality for a large variety of alloys and workpieces requires that reliance upon human skill be minimized. However, such an automatic system must be relatively simple to operate so that semi-skilled technicians may utilize the system without affecting the quality of the weld produced. Further such a system must be sufficiently versatile to allow use in a variety of welding circumstances so that the cost of welding operation is not significantly increased in proportion to the quality of weld obtained.

Previous attempts to provide solution to the problem of automatic welding have produced automatic curve followers, photo cell scanners such as shown in our prior copending application Ser. No. 628,743 for AUTOMATIC WELDING SYSTEM, other highly sophisticated and complex programmed camming arrangements, and punched card computer controlled systems. Such systems all fail to meet the present requirements of simplicity of operation with minimized possibility of operator error together with precision repeatability of desired weld program and simplified operator control.

SUMMARY OF THE INVENTION

The present invention provides an automatic control system in which all control elements and parameters are precisely controllable by an operator in the field who will merely select a desired program and initiate operation of the equipment. Principles of the present invention are illustrated in connection with a preferred embodiment thereof which is directed toward control of an orbit arc welder. The system embodies a number of signal circuits each of which is arranged to generate an output signal that controls a different one of the parameters necessary for a total welding operation. Such parameters include a variety of current levels, a predetermined amount and rate of current upslope and downslope, timing of the various operations, electrode travel rate, and arc control and initiation. Each of the parameter controlling circuits is arranged to be controllable itself in linear relation to a resistance forming part of such circuit. All such resistances, of which each controls a given parameter circuit, are collected and mounted together mechanically and electrically for quick connection and disconnection to the circuit whereby any given group of controlling resistors may be removed as a group and a different group, establishing a different set of parameters and thus a different program, may be substituted therefor. In a preferred embodiment a number of resistor groups are all mounted in a program module stack and one group is selectable at the control of an operator by means of a simple switching arrangement.

In a described embodiment the programmed welding power supply includes a plurality of switching transistors that are repetitively operable between substantially high conductions and substantially low conduction at a controllable duty cycle. Improved closed-loop current regulating and less current ripple are provided by a unique pulse width control of duty cycle. One or more of the switching circuits may be connected or disconnected to provide an incrementally varing or modular power supply.

For improved starting of a welding arc in accordance with the described embodiment of this invention, there is provided a high frequency current source that is initiated together with actuation of a high impulse starter. Means are provided to switch current from the impulse starter through the electrode and arc upon ionization of the gas around the electrode.

Motor speed control for driving the electrode over the workpiece is precision controlled, in accordance with the preferred embodiment of the invention, through the same resistor program card by use of a pulse width modulator which energizes the motor winding with discrete driving pulses. A rate feedback for comparison with a commanded motor speed signal is derived from the back electromotive force of the motor at intervals between driving pulses. The feedback signal is compared with the command signal, the error is stored and subsequently caused to generate a pulse for energizing the motor winding.

DESCRIPTION OF THE DRAWINGS

FIG. 8 shows the current sensing circuit of the described embodiment;

FIGS. 11a, 11b, 11c and 11d illustrate waveforms generated in the circuitry of the pulse width modulator of FIGS. 10a and 10b;

FIGS. 15 (a–g) shows certain wave forms at various points of the motor speed control circuitry of FIGS. 13 and 14.

DESCRIPTION OF THE PREFERRED EMBODIMENT

Throughout the drawings like reference numbers are employed to designate like parts.

Figure 1:
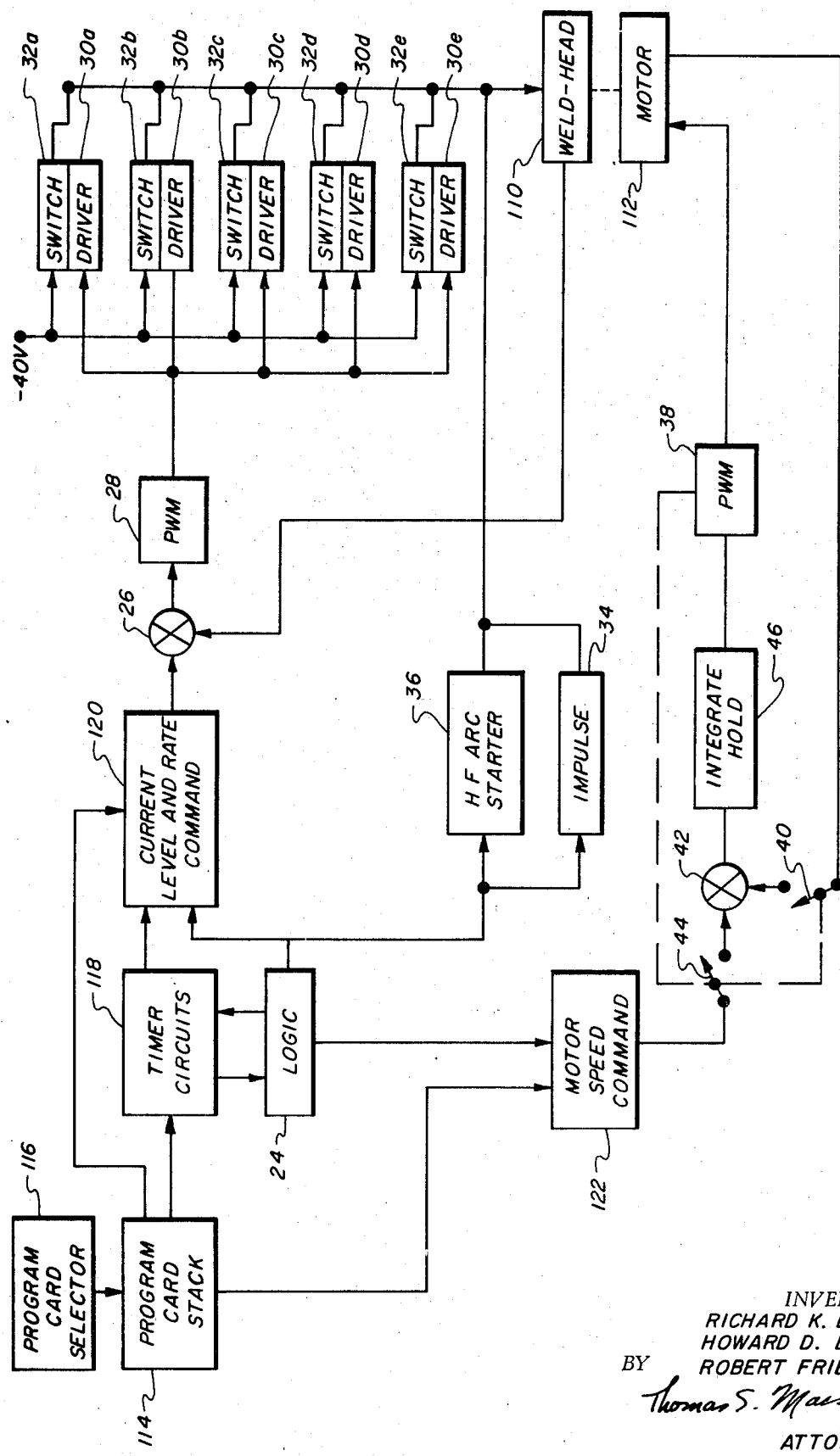
FIG. 1 is a block diagram of a preferred embodiment of a programmed welder constructed in accordance with principles of the present invention.

As illustrated in FIG. 1 the programmed welder of the preferred embodiment basically comprises two systems, the first of which provides control of the weld head and the second of which provides speed control of the motor which drives the weld head relative to the workpiece. As will be readily appreciated, the described system is applicable to a variety of different types of welding equipment and welding drive systems. For purposes of exposition there is described a system that is specifically arranged for operation of an orbit arc welder such as is described in U.S. Pat. Nos. 3,194,936 and 3,238,347. As particularly described in these patents, the welding arrangement includes a chamber for containing inert welding gas. The chamber is arranged to be secured to and about the periphery of a pipe or tubular member to be welded. Mounted within the chamber for motion about the pipe under control of a drive motor 112 and suitable gearing is a welding electrode torch or weld head 110 (FIG. 1).

In general, to perform a weld of this nature, the atmosphere about the electrode is purged with inert gas, the arc is started by high frequency or impulse, the main weld head current is brought up to a first level at a predetermined rate, the motor is started to initiate travel of the electrode relative to the workpiece and the weld current is held at a first desired level, generally for the duration of a complete traverse of the electrode about the periphery of the workpiece. If a second traverse of the electrode about the workpiece is required, the current level may be reset at the end of the first traverse and electrode movement is continued for a second full circle, at which time the weld current is decreased at a predetermined rate. When the current has decreased to a desired value, the current is shut off, the motor is stopped to stop the electrode and a second purge of the gas is accomplished.

Accordingly it will be seen that the variables to be controlled by the program include starting current, a variety of operating current levels, up and downslope rates, time of duration for the various current levels, delay time to enable startup of the motor and, of course, motor speed. In accordance with the present invention, each of these variables may be controlled by a resistor card included in a program card stack 114. One of the resistor cards of the stack may be selected by the operator by means of a selector-controller 116. The resistors on the selected program card each controls a given one of several timer circuits 118, current level and rate command circuits 120 and motor speed command circuits 122, all of which are under control of a group of solid state or relay logic 24.

Current level or rate, as the case may be for a particular portion of the selected program, is generated under control of the selected program card by a command circuit 120 and fed to an error comparator 26 which compares the commanded current level with an actual current level sensed at the weld head by a conventional meter shunt in the weld current path. This meter shunt, as is well known, provides a feedback voltage proportional to the weld current.

The error signal from the comparator 26 is fed to a pulse width modulator 28 which provides a series of output pulses of generally square wave configuration, each having a duration directly proportional to a commanded current level. The output of the pulse width modulator is fed to control each of a plurality of switch drivers, 30a, 30b, 30c, 30d and 30e, each of which individually controls the state of a bi-state device or transistorized switch 32a through 33e respectively. Each switch is arranged to connect a weld current supply of negative 40 volts d.c. to the weld head. It will be readily appreciated that, with the illustrated arrangement, one or more of the switches may be connected or disconnected from the circuit whereby the total weld current available to the weld head may be varied in increments of, for example, 20 amperes for each of the current switches. With this arrangement, power supply for welding with a variety of maximum ranges may be readily achieved. Thus the total weld current available is variable in major increments of 20 amps, for example, by adding or decreasing a weld current switch 32 and driver 30. In addition, after choice of any major increment, the current is selectively and proportionately variable under control of the pulse width modulator and current level as commanded from the programmed card.

Under control of the program logic 24 both an impulse starter 34 and a high frequency arc starter 36 are initially energized to first provide a high frequency ionization of the inert gas surrounding the electrode, and thereafter, upon such ionization, to provide a high amplitude short duration pulse of current through the electrode to initiate the arc. The arc is thereafter sustained by the commanded weld current through the group of modular switches 32.

Starting and stopping of the motor 112 is under control of logic 24. Motor speed control is established by one of the resistors on the program card to provide a commanded preselected motor speed. In the described arrangement the motor is driven by a plurality of pulses from a pulse width modulator 38 which is analogous to the pulse width modulator 28 of the power switch drivers. Pulse width modulator 38 provides to the motor a repetitive series of pulses of varying duty cycle wherein the duty cycle commanded by the program card resistor represents the desired motor speed. In order to assure attainment of the commanded speed, a rate feedback is employed in which, shortly after termination of each motor driving pulse from the pulse width modulator, the back electromotive force of the motor is sampled and fed via a switch 40 as one input to an error comparison circuit 42. The error circuit receives as its second input a signal representative of the commanded motor speed, which is fed to the comparator 42 by means of a switch 44. Switches 40 and 44, which operate in effect as sampling circuits, momentarily couple the rate feed-back signal and commanded speed signal to the comparator which provides a difference signal to an integrate and hold circuit 46 which stores the signal for subsequent transmission as a pulse width modulator control signal. The sampling switches 40 and 44 are ganged and operated in synchronism from the pulse width modulator, whereby the sampling and generation of the rate error signal is achieved at a predetermined interval subsequent to termination of each driving pulse from the pulse width modulator 38. The motor speed control circuit will be described in greater detail hereinafter in connection with FIGS. 13, 14 and 15.

Figure 2:
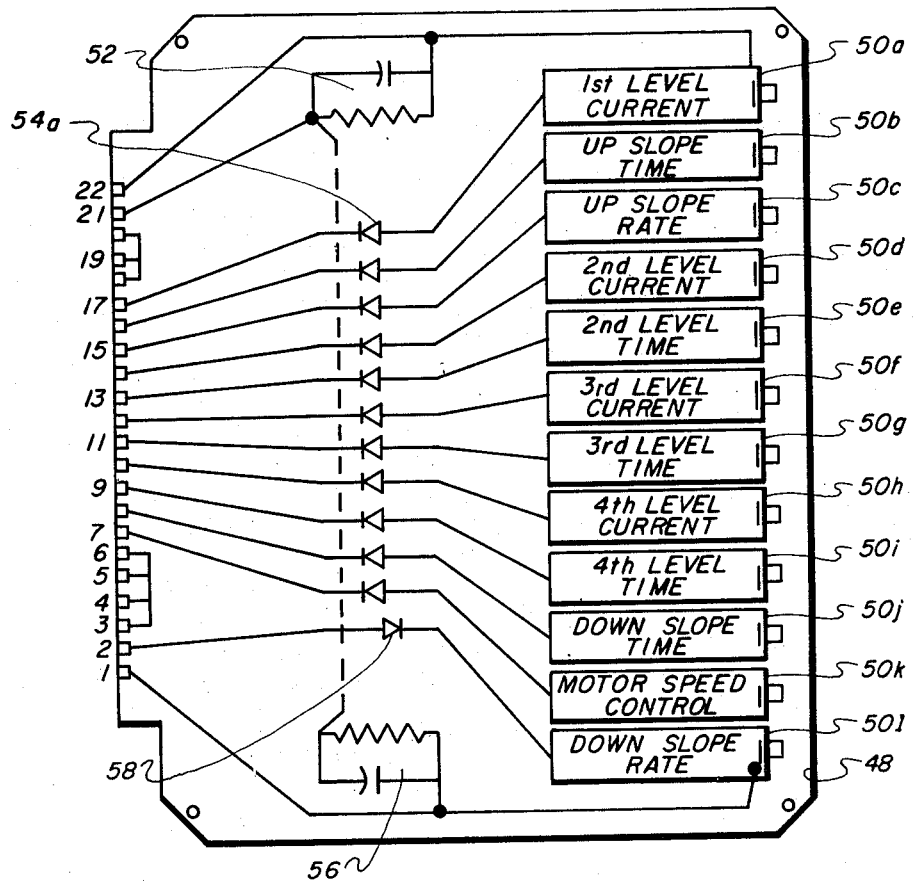
FIG. 2 illustrates a single program card carrying the resistors which control the various parameter signal control circuits.
Figure 4:
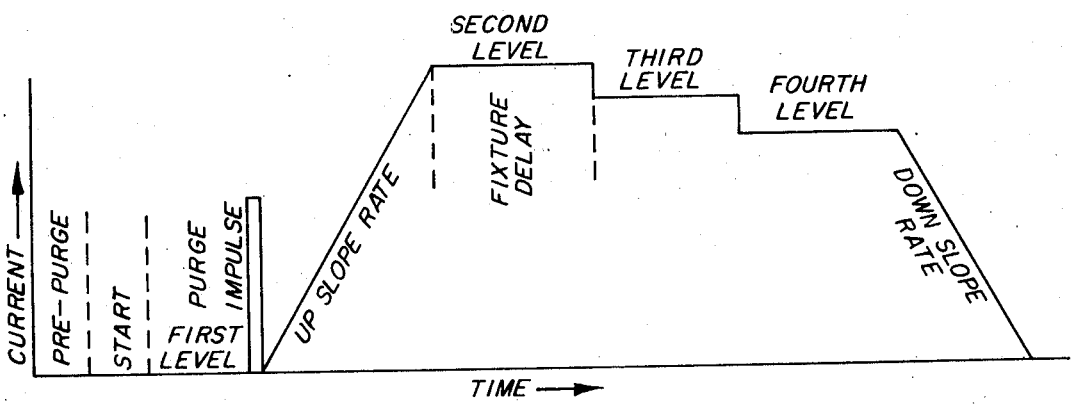
FIG. 4 is a timing chart illustrating one complete program cycle of weld current.

An exemplary program card, as illustrated in FIG. 2 comprises a rigid or semi-rigid self-supporting card or support 48 on which are mounted a group of resistors 50a through 50l inclusive. Resistors 50a through 50k all have one end thereof connected to each other and also connected in common to a contact 22 of the program card. The commonly connected ends of resistors 50a through 50k are also connected in common to a parallel resistance capacitance circuit 52 which in turn is connected to a second contact 21 of the resistance card. The resistance card 48 includes a plurality of individual contacts indicated as contacts 1 through 22 inclusive, of which contacts 3, 4, 5 and 6 are electrically connected to each other, as are contacts 18, 19 and 20. Each of resistors 50a through 50k is individually connected at the other side thereof through a diode such as diode 54a to a different one of contacts 7 through 17 inclusive, respectively, of the resistance card.

Resistor 50l of the program card is uniquely connected at one end thereof to one side of a second resistance capacitance circuit 56 and to contact 1 of the resistance card. The other end of resistor 50l is connected by means of a diode 58, which is poled oppositely with respect to the diodes connecting the other resistors of the card, to card contact 2. The end of the resistance capacitance circuit 56 remote from its connection to resistor 50l is connected to card contact 21. The reason for the unique treatment of resistor 50l lies in the fact that this resistor controls the downslope rate and must provide a negative voltage to its control circuit whereas all of the other resistors are arranged to provide positive voltage to the circuits controlled thereby, as will be described below. Accordingly program card contact 1 is arranged to be connected to a negative 15 volt d.c. supply whereas program card contact 22 is arranged to be connected to a positive 24 volt d.c. supply as will be more particularly explained in connection with FIG. 3.

PROGRAMMING

In a preferred embodiment of the program card stack, all of the cards and all of the resistances thereon are made identical and each resistance is made variable comprising, for example, a potentiometer. Each such variable resistance is then set to provide the selected resistance value of a given program. With such an arrangement any program, once identified by the resistance settings, may be readily duplicated at a different location for use in another similarly calibrated machine. Values of the different resistors need be only transmitted from one location to another and an identically calibrated machine at such second location to another and an identically calibrated machine at such second location can thus be supplied with the program defined and proven at the first location.

Figure 3:
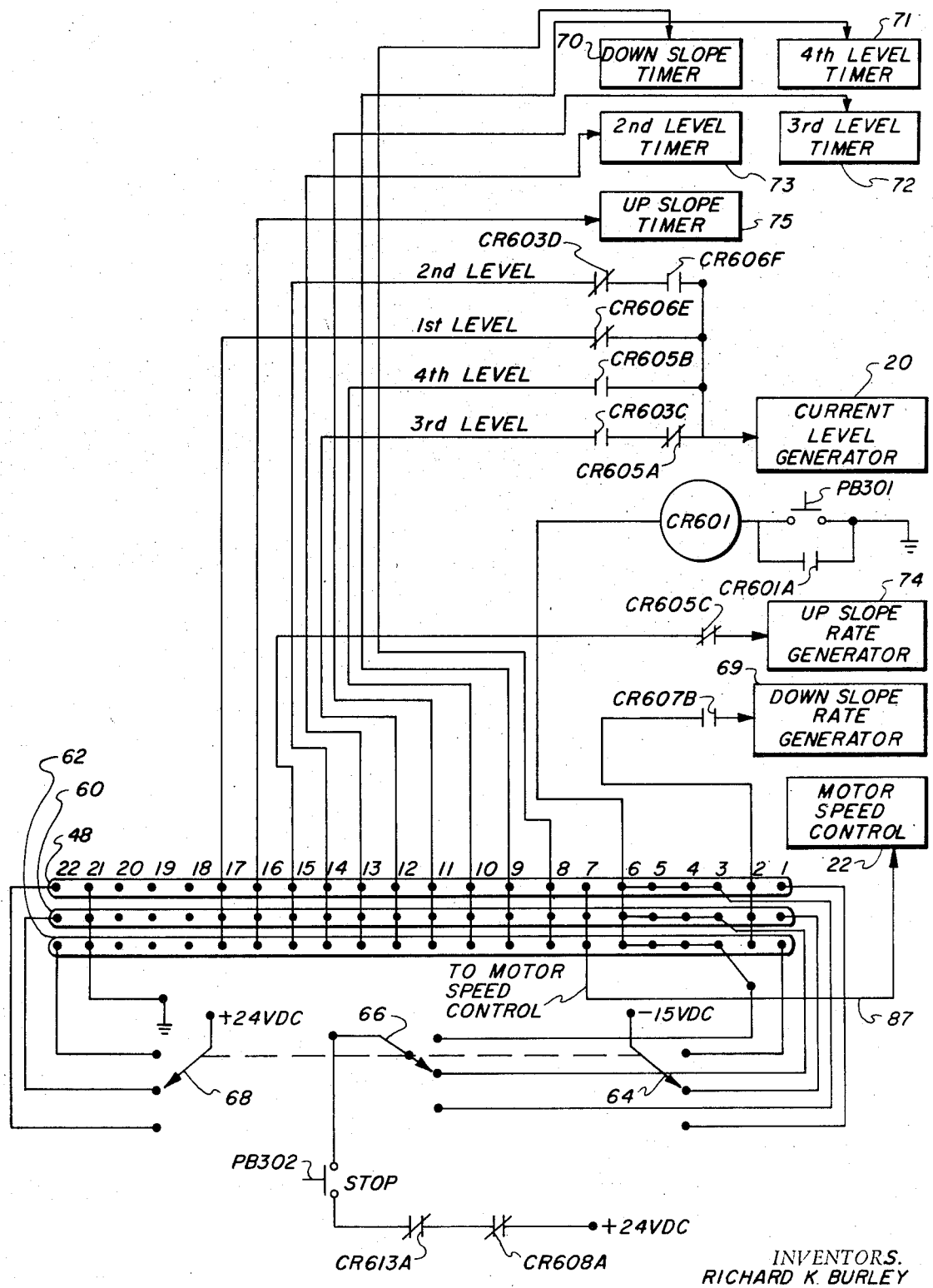
FIG. 3 illustrates a program card stack showing, for purposes of exposition, three cards, related switching, and circuits operated from the cards.

Illustrated in FIG. 3 is a program card stack embodying three program resistor cards 48, 60 and 62, each of which is identical to that illustrated in FIG. 2 although as will be immediately apparent, the values of one or more of the resistors will be chosen or varied as necessary or desirable to obtain a particular preselected program of operation. Although but three resistor program cards are illustrated in FIG. 3, and although 20 such cards are employed in one actual operating embodiment of the described invention, it will be readily appreciated that other numbers of cards may be provided or groups of cards may be replaced collectively so that no limit on the total number of programs available exists.

The program card selector comprises a group of banks or ganged switches of which the banks are illustrated as comprising switches 64, 66 and 68, shown in position of the switch banks wherein the program card designated as 60 is selected for control. In the uppermost of the three switch positions, program card 48 is selected whereas in the lowermost position the program card 62 is selected. It will be readily appreciated that the ganged switches 64, 66 and 68 may be manually operated with their operating positions visible to the operator. If larger numbers of cards are employed, an automatic stepping switch of conventional design may be employed so that the operator, to select a specified program, need only dial to an indicated card number to cause the switch banks to step in synchronism to the selected card. In the illustrated arrangement, resistors of all program cards are at all times coupled to the circuits controlled thereby, to the extent permitted by the system logic. It is the connection of these resistors to the supply voltage that is varied by operation of switches 64, 66, 68.

Switch 64 is connected to the negative 15 volt d.c. source mentioned above and connects to contact 1 of the selected program card. Contact 1 is coupled via downslope rate resistor 50l and diode 58 to contact 2 of the program cards and then is connected through a set of normally open relay contacts CR607B of the system logic to a downslope rate generator 69 to be more particularly described hereinafter.

As previously mentioned, the logic of this program system employs a series of solid-state relays and relay contacts. For ease in understanding the description, it is noted at this point that with the descriptive terminology employed, the relay number which is prefaced by CR (control relay) indicates the relay energizing coil when not followed by a letter suffix. When the relay number is followed by a letter suffix, the indication is of a set of relay contact operated by the relay coil bearing the same number. Thus, for example CR607 denotes a control relay coil and CR607B denotes a set of contacts controlled by CR607.

Card selector switch 66 couples the card through a normally closed stop push-button PB302 to a source of 24 volts d.c. via normally closed relay contacts CR613A and CR608A.

Program card selector switch 68 is connected to a source of positive 24 volt d.c. and couples to the contact 22 of the selected resistance program card which is in turn connected in parallel to one side of each of program resistors 50a through 50k inclusive. Program card contacts 21 are all connected to a common line or ground as indicated.

Program card contacts 7 are connected to each other and then directly to the motor speed control circuit 22, more particularly described hereinafter in connection with FIGS. 13, 14 and 15. Program card selector switch 66 connected as previously described to a positive 28 volt d.c. supply, is coupled via program card contacts numbers 3 through 6 to a start-stop relay coil CR601 which is in turn connected to ground through parallel paths including a normally open start-push button PB301 and normally open self-locking contacts CR601A which lock in relay coil CR601 when the latter is energized by operation of the start button PB301.

It will be noted that although like contact numbers, such as contact numbers 7 through 17, for example, of the program card resistors, are all connected to each other, only one of the cards is operable for any selected program since only one of the cards has the other end of its resistor, namely that coupled with card contact number 22, connected to the positive 24 volt d.c. supply.

Program card contacts number 8 are connected to provide downslope timing to a downslope timer 70, more particularly described hereinafter. Program card contacts 9 are connected to a fourth level timer 71. Contacts number 10 are connected to provide fourth level current command by normally open relay contacts CR605B to the current level generator 20. Contacts 11 are connected to a third level timer 72. Contacts 12 are connected to provide third level command to the current level generator 20 via normally open contacts CR603C and normally closed contacts CR605A. Program card contacts 13 are connected to a second level timer 73. Program card contacts number 14 are connected to provide second level current command to the current level generator via normally closed relay contacts CR603D and normally open relay contacts CR606F. Program card contacts 15 are connected to an upslope rate generator 74 via normally closed relay contact CR605C. Program card contacts 16 are connected to an upslope timer 75 and program card contacts 17 are connected to provide to current level generator 20 the first level command signal via normally closed relay contacts CR606E. The various timer, rate and current circuits 69 through 75 all will be described with greater particularity hereinafter.

Illustrated in FIG. is a graph of current level against time for a typical program under control of the embodiment of the invention described herein. It will be seen that prior to pressing the start button, upon providing power to the circuits, a pre-purge cycle is achieved by the purge timer to be described hereinafter. Then, upon pressing the start button, a first purge is accomplished, also under control of the purge timer. At the end of the purge timing cycle, the impulse start together with high frequency ionization occurs and weld current is applied at a commanded upslope rate to attain a predetermined or second level of weld current At the end of the upslope period a delay period is provided for fixture delay and thereafter the motor is started and current to the weld head is established at a third level. Upon completion of the third level time period, normally coinciding with completion of one complete traverse around the periphery of the workpiece, a second traverse may be started at a fourth weld current level. It will be readily appreciated, however, that where but a single traverse of the workpiece is required, the third and fourth level time intervals may be decreased accordingly and the third and fourth current levels may be made equal. At the end of the fourth level time downslope of the current level is initiated at a predetermined rate. Thereafter all is stopped, either by termination of the downslope timer interval or by decrease of the weld head current below a predetermined level.

Illustrated in FIGS. 5a, 5b, 5c and 5d is the relay logic of the illustrated embodiment of programmed welder which will be employed to describe the sequence of operation of the various circuits that are caused to operate under control of the program cards. The ensuing description will follow an exemplary program from its beginning to the completion of the weld with detailed explanation of the various circuits as they come into operation.

On initial connection of power to the system a separate positive 28 volt d.c. source is energized and a purge solenoid 101 (FIG. 5a) is energized from the 28 volt d.c. to ground via normally closed contacts CR609A to initiate a pre-purge. At the same time the purge timer shown in detail in FIG. 6 initiates its timing operation. This is achieved by the logic shown in the upper portion of FIG. 5a providing 28 volt d.c. to the purge timer 76 or, more specifically, to the collector of transistor Q601 thereof (FIG. 6) via normally closed relay contacts CR608A and CR613A, closed stop switch PB302 and closed start switch PB301B.

PURGE TIMER

Figure 5A:
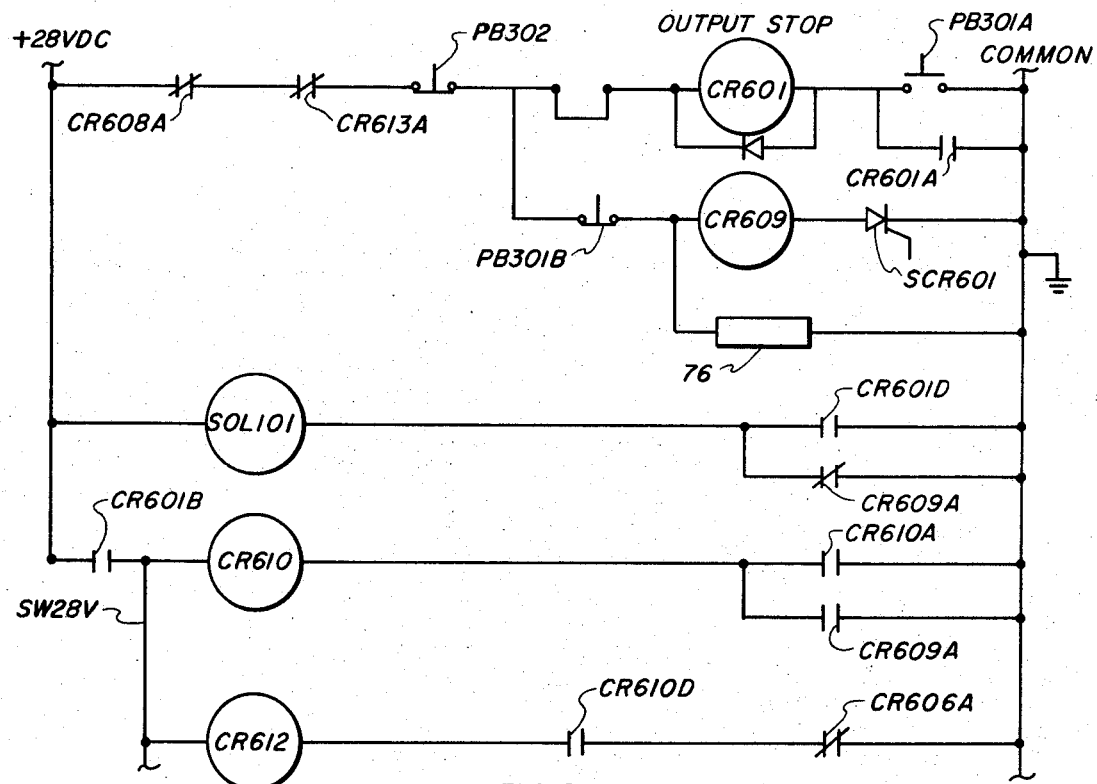
FIGS. 5a, 5b, 5c and 5d illustrate relay logic which controls the programmer of the illustrated embodiment, with the relays shown generally in order of chronological operation.
Figure 6:
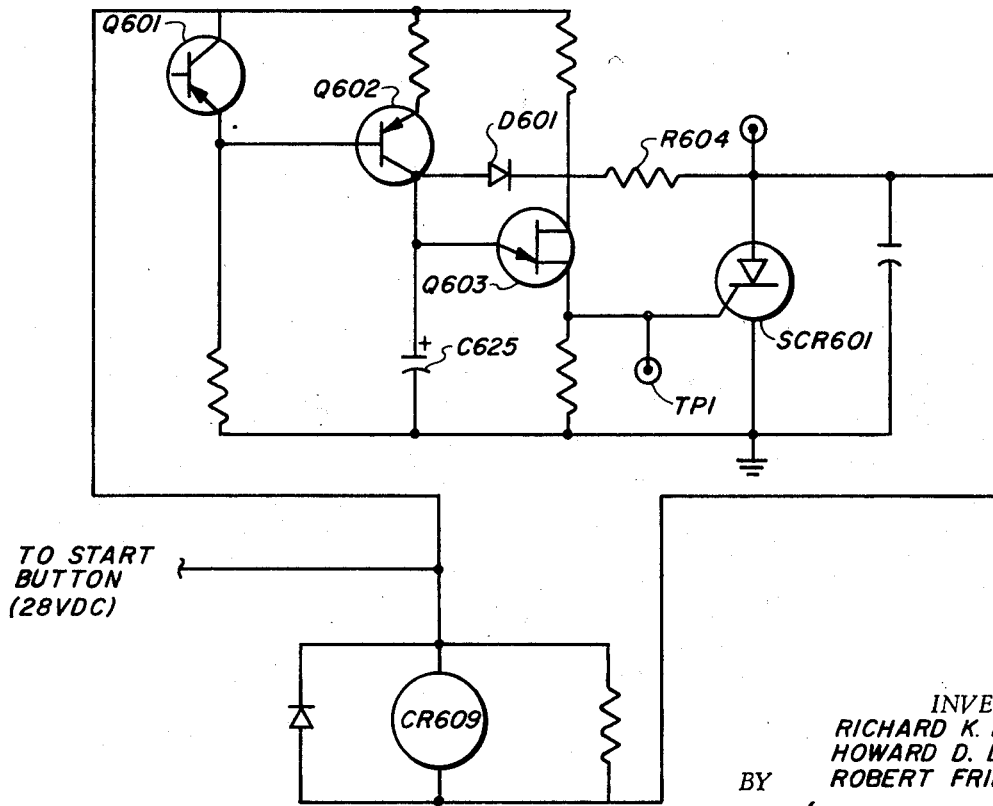
FIG. 6 illustrates a timing circuit for purge operation.

The purge timer (FIG. 6) comprises a relaxation oscillator formed by a pair of transistors Q601 and Q602 which are connected to form a constant current generator. Transistor Q601 acts as a zenor diode, holding the base voltage of Q602 constant to thereby provide a constant current through the emitter-collector circuit of Q602. This transistor thus conducts via the path illustrated in FIG. 5a to charge a timing capacitor C625. The junction between the collector of Q602 and the capacitor is connected to the control electrode of a uni-junction transistor Q603 which has the base electrodes thereof resistance-connected between the 28V supply and ground. When the voltage on capacitor C625 rises sufficiently, the uni-junction transistor Q603 fires to provide a positive pulse at TP1. This point is coupled to the control electrode of a silicon control rectifier SCR601 which is connected between ground and the collector of transistor Q602 by means of a diode D601 and a resistor R604. When SCR601 fires, at the end of the purge timer interval, CR609 is connected through the SCR to ground and is therefore picked up (energized) as illustrated in FIG. 5a. When CR609 is picked up, contacts CR609A open to de-energize the purge solenoid 101. Now the start button PB301A is pressed, opening PB301B to take the power off CR609 and extinguishing SCR601. Upon pressing start button PB301A relay CR601, the start-stop relay, is picked up via contacts CR608A, CR613A and closed stop button PB302 as illustrated in FIG. 3. CR601 is locked in by locking contacts CR601A. This relay by means of contacts CR601D keeps the purge solenoid energized to maintain flow of inert gas to and about the arc.

Figure 9A:
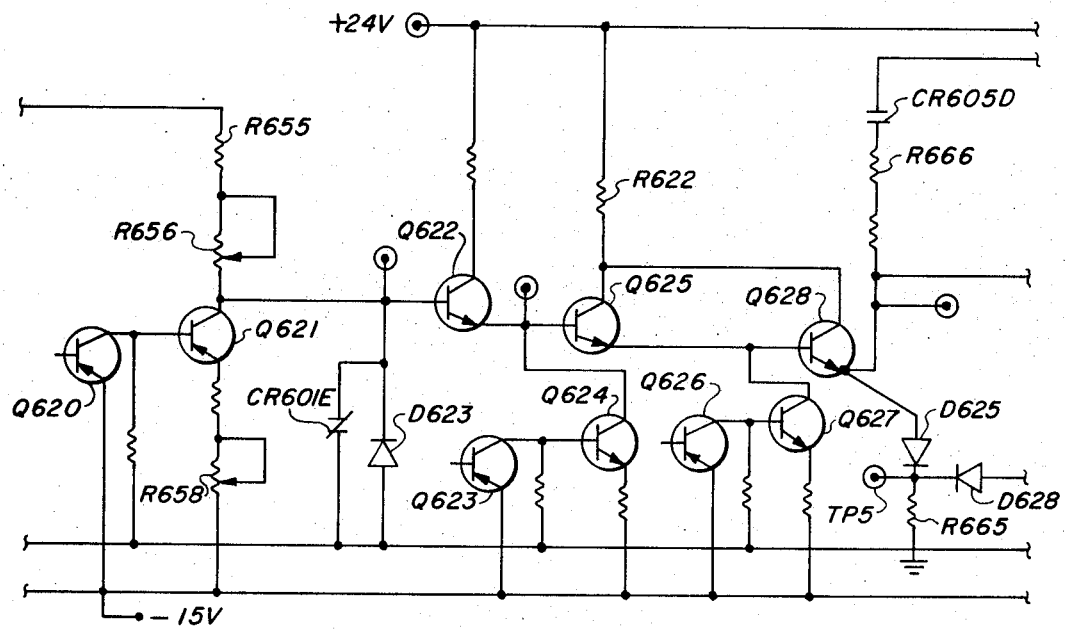
FIGS. 9a and 9b illustrate the current generation circuits including constant current generators, and slope and rate circuits of the described embodiment.

When CR601 picks up, switched 28 volt d.c. is made available to the various control relay coils by means of contacts CR601B, and, by opening contacts CR601E as shown in FIG. 9a, the first level command signal is made available to the current command circuit.

At the end of this purge time interval, CR609 again picks up and, since positive 28 volt supply is now available through CR601, a relay coil CR610 is picked up via contact CR609A which may be provided with a time delay closure. CR610 locks up through locking contacts CR610A.

Figure 5B:
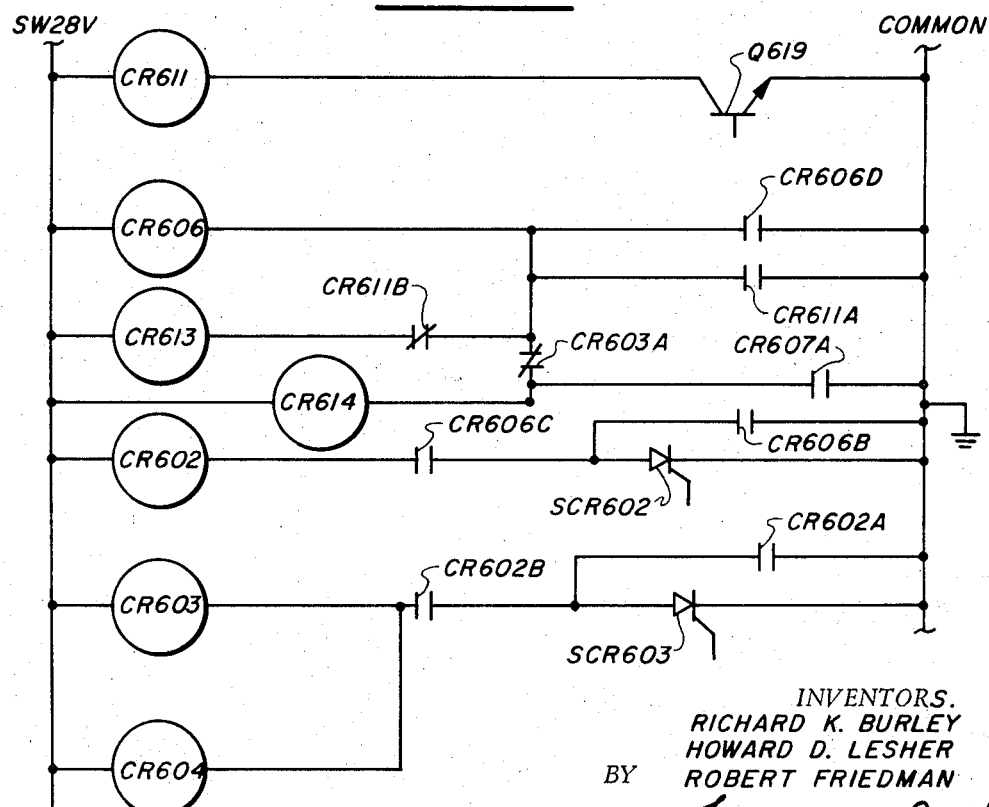
Figure 5C:
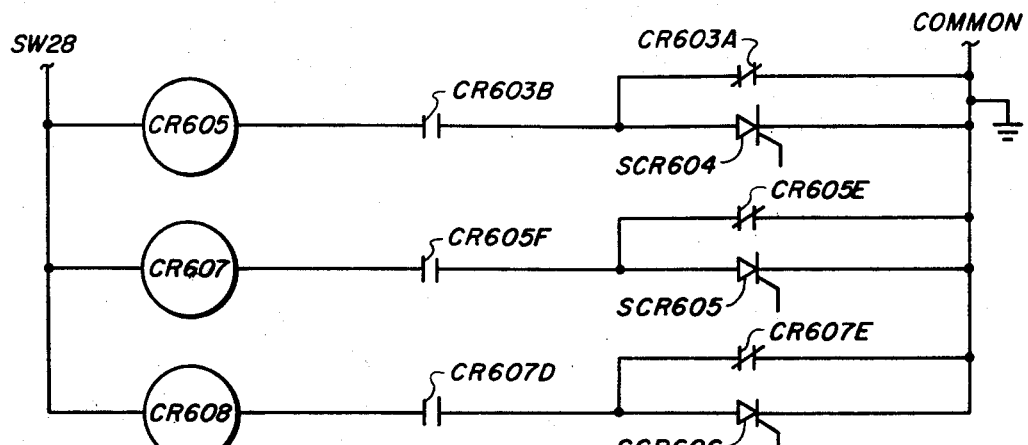
Figure 5D:
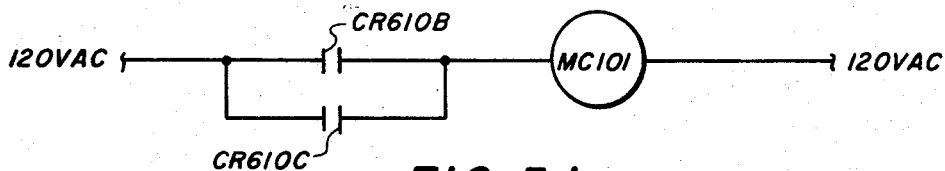

As illustrated in FIG. 5d, closure of contacts CR610B and CR610C provides 120 volt a.c. current to a main contactor relay coil MC101. The main contactor relay, when picked up, provides the welding power supply current as will be more particularly described hereinafter in connection with FIG. 8.

ARC STARTING

Contacts CR610D also pick up a relay CR612, the impulse relay. The impulse relay, via contacts CR612A provides 120 volt a.c. to the starter impulse circuit (see FIG. 7). This a.c. current is fed through a transformer T801 and a diode bridge BR801 to start the charging of an impulse capacitor C801 via a resistor R801. A high frequency start relay coil CR801 is connected across the impulse capacitor C801 and, when the charge on the capacitor rises to a sufficient level, CR801 picks up, closing contacts CR801A, and providing 120 volt a.c. to a transformer T901 of the high frequency starter circuit. The high frequency starter circuit includes a standard RF spark gap SP901 connected across a high frequency tank circuit comprising capacitor C901 and a very low d.c. resistance coil L901. The oscillatory sign in the tank circuit is applied across the welding torch. This causes the gas between the torch electrode and the workpiece to ionize. The gas thereupon drops in impedance. Capacitor C801 is also coupled to the torch via diode D801, inductance L701, resistor R707, and inductance L901. With the low impedance between the torch and the workpiece due to gas ionization, capacitor C801 discharges through the described circuit to provide a high current short duration spike through the ionized gap which properly heats the electrode so that the arc may be maintained by current from the main supply. When capacitor C801 discharges, relay CR801 drops out and the high frequency circuit is de-energized. If the arc is made, the current sense relay, to be described below in connection with FIG. 8, picks up and turns off the 120 volt a.c. to transformer T801. If the arc does not start capacitor C801 recharges and the starting cycle repeats.

CURRENT SENSE

The current sensing circuit, FIG. 8, detects current on the primary side of a three phase bridge which drives the power switch modules. A source of welding current supply 80 such as three phase 440 volt a.c. is fed through main contactor relay contacts 101a, b and c and, via a power transformer T101, to a bridge rectifier 81. At the output of this rectifier is provided the minus 40 volt d.c. supply to the power switches 32 illustrated in block form in FIG. 1. A plurality of sensing coils, 104, 105, 106, one for each phase, is coupled via a resistance network 82 to a low current bridge rectifier 83 of which the output is fed through a potentiometer 84 and zenor diode 85 to the base of a transistor Q619 which has its emitter connected to ground and includes a relay coil CR611 in its collector circuit. Capacitor C639 is provided to prevent Q619 from turning on due to noise spikes and false starts. Accordingly, it will be seen that when an arc is initiated by the impulse and high frequency starter circuitry previously described, the arc current is sensed by pickup coils 104, 105 and 106, to provide a signal via the diode bridge 83 to the base of Q619, which thereupon picks up the current sense relay CR611. This relay, as will be presently described, provides the rest of the system with the information that the arc has, in fact, been started.

Returning now to the relay logic circuit of FIG. 5b, it will be seen that an on-off relay CR606 is picked up by contacts CR611A and locked in by contacts 606D. This on-off relay initiates a number of different operations including the dropping out of CR612, the impulse start relay, start of the upslope timer, pickup of slope relay CR614 to start the upslope rate, and switching of command current to the second level.

If CR606 picks up and the arc should be extinguished or the current fall to an unacceptable level whereby CR611, the current sensing relay, is dropped out, the logic provides for the pickup of an automatic reset relay CR613 via contacts CR606D when contacts CR611B are in their normally closed position. If CR613, the automatic reset relay, should pick up, contacts CR613A, illustrated in FIG. 5a, will open to drop out the start-stop relay CR601.

When on-off relay CR606 picks up, the high frequency impulse relay, CR612, drops out by opening of contacts CR606A whereby CR801 (FIG. 7) drops out and the high frequency is de-energized.

One of the functions achieved by the pickup of the on-off relay, CR606, is the switching of the commanded current from first level to second level. This may be more readily understood in connection with the detailed circuit diagram of FIG. 9.

CURRENT COMMAND

Current level command is provided to the current level generator 20 as illustrated in FIG. 3 via the programmed resistor and, for first level current command, via relay contacts CR606E (which are closed before CR606 is picked up). Thus 24 volt d.c. supply is fed to the current level generator via the first level program resistor which then controls the level of current to be generated. Current from the supply is fed via the program resistor through resistors R655 and potentiometer R656 of FIG. 9 to the collector of a transistor Q621. As described above in connection with a similar circuit of the purge timer of the FIG. 6, the base of the transistor Q621 is in effect clamped to −15V by a transistor Q620 whereby the circuit becomes a constant current generator. A potentiometer R658 in the emitter circuit of Q621 enables manual control of the current to provide proper scaling. Potentiometer R656 is employed to furnish voltage level adjustment. A diode D623 is connected between ground and the collector of Q621 to prevent this point from going negative. Thus it will be seen that the collector voltage of Q621 is a function of the program resistor. It will be recalled that upon pickup of CR601, contacts CR601E are opened to remove the shunt formed by these contacts between the collector of Q621 and ground. The voltage at the collector of Q621 is therefore linearly related to the program card resistance 50a of FIG. 2. The collector of Q621 drives two stages of emitter followers comprising transistors Q622 and Q625, each of which has a constant current generator connected between its emitter and ground. The constant current generator for Q622 comprises a pair of transistors, Q624 and Q623, which are connected and which operate in much the same manner as transistors Q621 and Q620. Similarly the constant current generator for Q625 is comprised of transistors Q627 and Q626. These constant current generators minimize variation of current loads with voltage level and thereby reduce effects of changing base to emitter voltage drops due to changing currents. The emitter of Q625 drives a third emitter follower stage Q628 which has its collector connected to ground via a diode D625 and a resistor R665. The use of three stages of emitter follower circuitry enables conversion from the relatively high impedance source of Q621 to a low impedance source represented by Q628. This low impedance is required because it is employed as a voltage clamp circuit as will be described hereinafter.

Figure 9B:
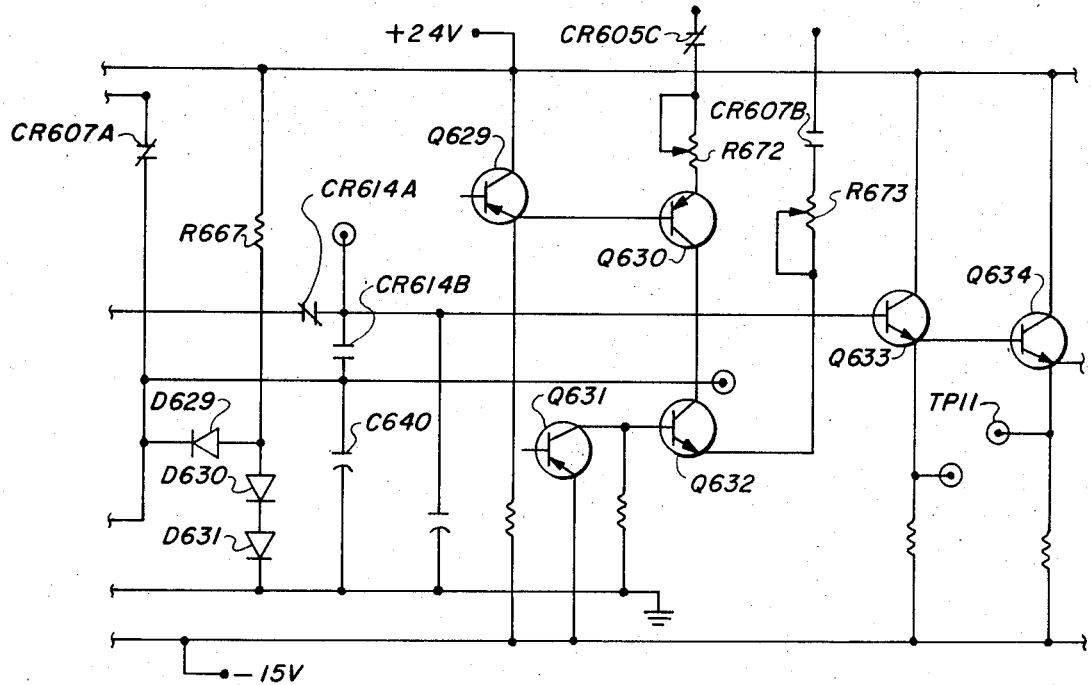

FIGS. 9a and 9b form a single circuit when FIG. 9b is located horizontally aligned with and to the right of FIG. 9a. With relay CR614 not yet pulled in, contacts CR614A (FIG. 9b) are in their normally closed position and the voltage on the emitter of Q628 is fed through two stages of emitter follower circuits comprising transistors Q633 and Q634. The signal at the emitter of Q634, at TP11 forms the current command generator output. This signal is fed to the pulse width modulator of FIG. 10 as more particularly described below.

The voltage at TP11 may be monitored to facilitate adjustment of potentiometers R656 and R658.

Turning to the logical and chronological description, it will be recalled that upon pickup of CR606, the commanded current is changed from first level to second level. This may be seen in FIG. 3 wherein contacts CR606E opens and contacts CR606F close, thereby switching from program resistor 50a to program resistor 50d which now controls the voltage on Q621 of the current generating circuit. This second level current is not a current that is applied to command the weld current but is primarily employed to provide a level to which the command current may charge to at the upslope rate. Thus CR606, when it picks up, also starts the upslope timer and the upslope rate control.

From the resistor 50c of the program card and via normally closed contacts CR605C, transistor Q630 (FIG. 9), connected as a constant current generator with Q629, is caused to provide a current at a rate determined by the program resistor. Current flowing through Q630 is caused to linearly charge a capacitor C640 which is connected between ground and normally open contacts CR614B and to the collector of Q630. The slope of the increasing charge on capacitor C640 is controlled by the amount of current provided to the capacitor via Q630. A potentiometer R672 in the emitter circuit of Q630 provides for a scaling adjustment that is set up during initial machine calibration. After the upslope has been initiated, switching from level one current to level two current, the rising voltage on capacitor C640 continues to increase until it is clamped to the voltage level on TP5 through diode D628. This clamping level is a function of the preselected programming resistance. In this instance and at this time this is the second level current command resistance.

With the pickup of relay CR614, via closing of contacts CR606D, contacts CR614A open and contacts CR614B close. Accordingly the voltage level on the capacitor C640 is now the voltage that is fed via emitter follower stages Q633 and Q634 to the current command generator output, and, further, the level command voltage appearing on the emitter of Q628 is no longer coupled to the current command generator output. Thus the circuit is under control of the upslope rate signal on capacitor C640 and is not under any current level control.

It is convenient at this point, although not in chronological sequence, to describe the downslope portion of the circuit which operates in a fashion similar to the upslope portion except that a negative ramp is created. This negative ramp is initiated at the completion of level four weld time at which time, as will be described hereinafter, CR605 is picked up to cause rapid discharge of capacitor C640 through CR607A (FIG. 9b) and now closed contacts CR605D (FIG. 9a) to the fourth level weld of the current command voltage at the emitter Q628. Simultaneously this pickup of CR605 opens the emitter circuit of Q630 (opening contacts CR605C) so that when the downslope relay CR607 is picked up, only the transistor Q632 of the downslope rate command will be connected across the capacitor C640. The transistor Q632 is connected as a constant current generator as previously described and has its base clamped by means of a transistor Q631. Thus Q632 is a constant current generator just as previously described except that it is an NPN transistor rather than PNP and has its emitter tied via CR607B and a potentiometer R673 to the source of negative 15 volt d.c. by means of the program card resistor 50l, the downslope rate program resistor ( see also FIG. 3). This arrangement provides a linear discharge path for capacitor C640 which creates the downslope. Scaling is accomplished as before, in the same manner as for upslope, where R673 is now the scaling resistor. It may be noted that the level on capacitor C640 cannot drop below about 0.7 volts due to the clamping action provided by a diode D629 that is connected to a +24V through a resistor R667 and via diode D628 and R665 (FIG. 9a) to ground. Diodes D630 and D631 act as a zenor diode obtaining current through R667 and providing the clamped voltage for D629.

TIMERS

Figure 12A:
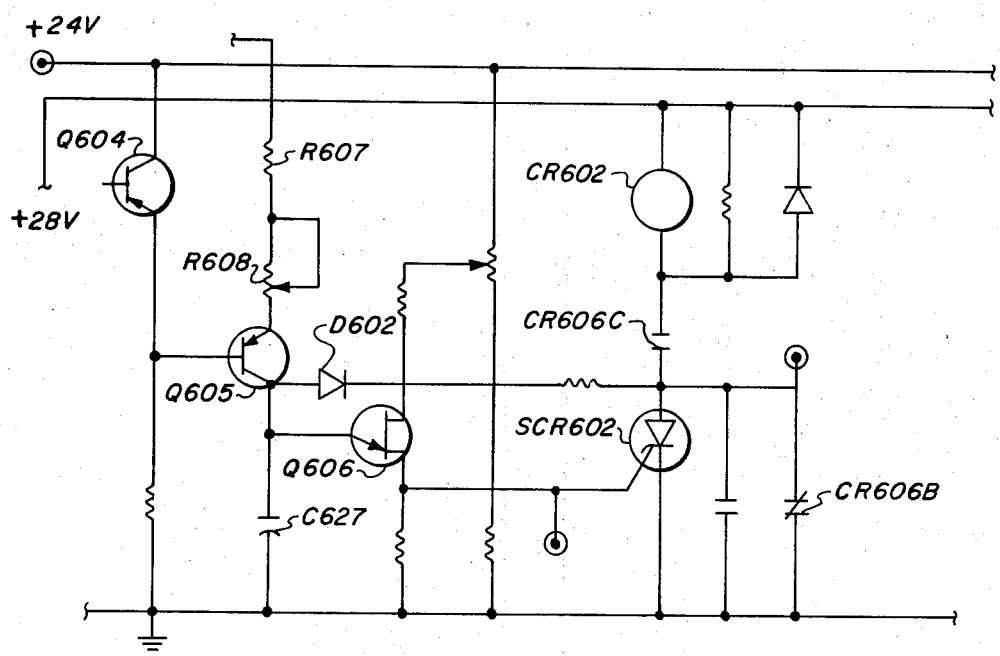
FIGS. 12a and 12b show circuitry of exemplary timers employed for upslope and second current level timing.
Figure 12B:
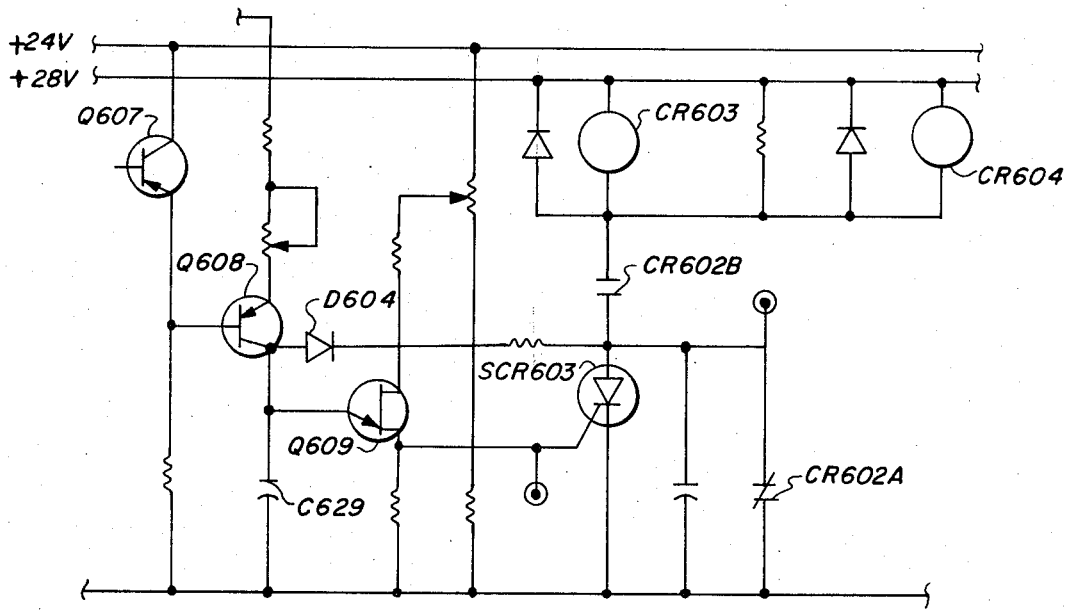

Once again referring to the description of the logic and chronology of a single program, it will be recalled that upon pickup of CR606 operation of the upslope timer was initiated. This timer, together with the second level timer, are shown in FIGS. 12a and 12b. The program resistor controlled voltage to the upslope timer is provided via program resistor 50b and resistor R607 through a potentiometer R608 to the emitter of a transistor Q605 which has its base clamped by transistor Q604 connected between +24 and ground, whereby the circuit has a constant current generator just as described in connection with the purge timer of FIG. 6. However, in this instance, the amount of current provided by this constant current generator is controlled by the program resistor. The constant current provided by transistor Q605 is employed to linearly charge a timing capacitor C627 which thereupon charges to a value, after a pre-determined time interval, sufficient to cause firing of a uni-junction transistor Q606. Firing of Q606 provides a positive pulse to the control electrode of a silicon control rectifier SCR602 which is connected at one side to ground and at the other side to +28 volts through the upslope control relay CR602 and normally open relay contacts CR606C. A unique feature of the upslope timer and other timers excepting only the purge timer, is the locking and unlocking arrangement provided for both the linear charging capacitor, such as capacitor C627, and the SCR such as SCR602. Thus, for example, a pair of normally closed relay contacts such as CR606B is provided across the conducting electrodes of the SCR and also across the capacitor C627 via a diode D602. Accordingly, in the absence of pickup of CR606, first, the capacitor of the timing circuit cannot charge and, second, the SCR cannot conduct through the relay CR602. When CR606 is picked up, the interval provided by this upslope timer may commence, the contacts CR606B are opened to allow charging of the timing capacitor C627 and the contacts CR606C are closed to permit firing of the SCR through the upslope relay CR602 at the end of the time interval.

Shown in FIG. 12b is the second level timer which is substantially identical to the upslope timer and includes a constant current generator provided by Q607 and Q608 with the current rate thereof controlled from the second level timer resistor of the program cards. A timing capacitor C629 is provided in the constant current circuit and is normally locked or prevented from charging by normally closed contacts CR602A connected across the capacitor via a diode D604. There is also provided a uni-junction transistor Q609 arranged to be fired when the charge on the capacitor reaches a suitable level and thus provide a positive pulse to trigger SCR603 which has its connection to the second level relay CR603 unlocked when CR602B is closed. The second level timer is slightly different from the upslope timer in that the firing of its SCR603 is arranged to pick up both second level relay CR603 and a fixture delay relay CR604. The latter operates to start the motor as will be more particularly described in connection with FIG. 14.

Several additional timer circuits are provided, a third level timer 72, a fourth level timer 71, and a downslope timer 70, all illustrated in block form in FIG. 3 and each substantially identical with the upslope timer of FIG. 12. These timers differ only in that they are controlled by different resistors on the program card, they are unlocked by different sets of relay contacts and they in turn pick up different relays, all as described in connection with the logic diagram of FIGS. 5a, b, c and d.

Figure 14A:
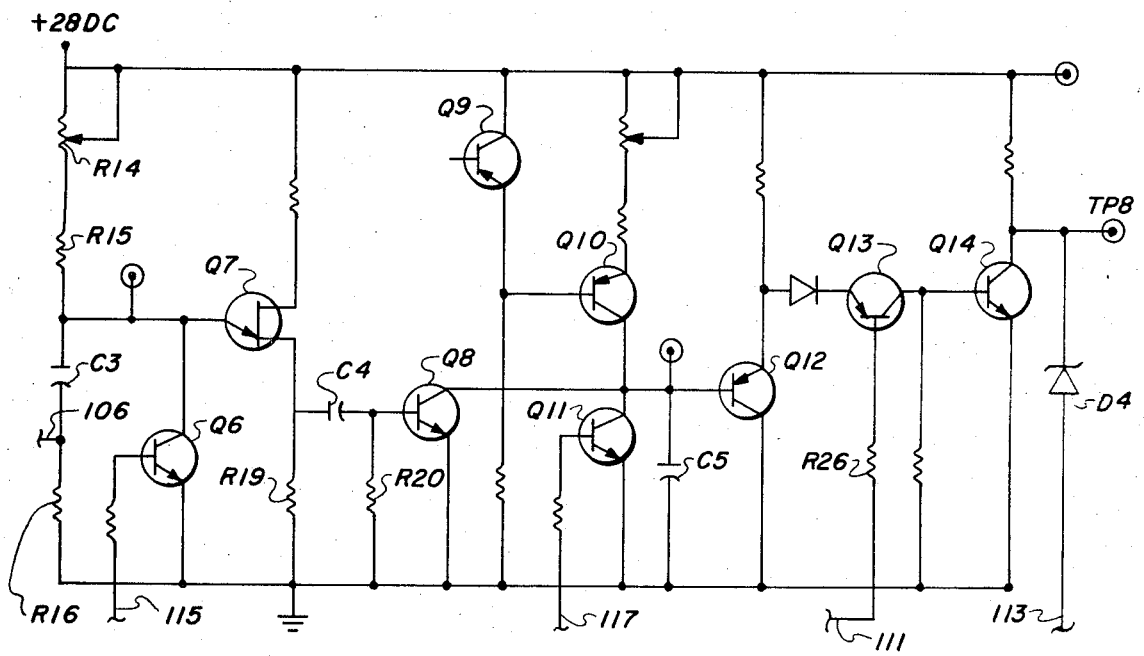
Figure 14B:
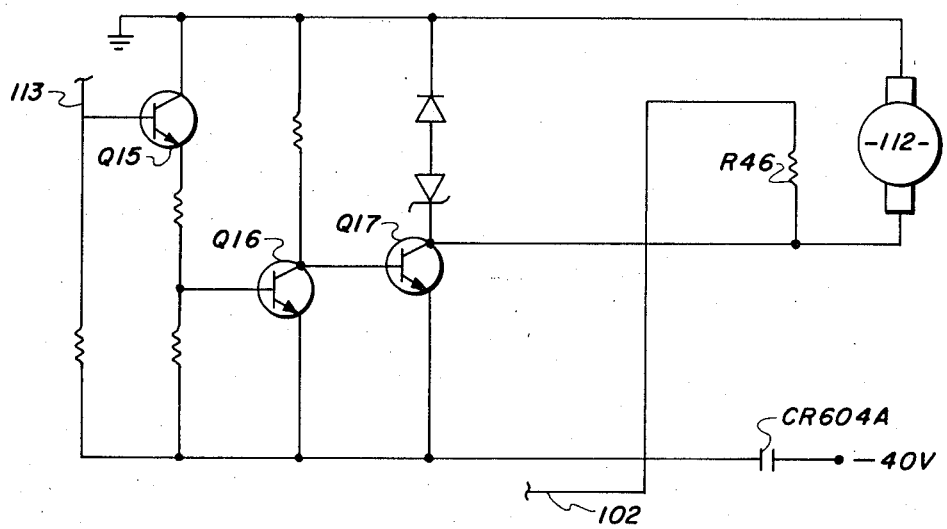

Continuing with the logical and chronological description, it will be recalled that CR606 picks up, unlocks the upslope timer via contacts CR606B and CR606C, (FIGS. 12a and 5b) whereupon CR602 is picked up at the end of the upslope time interval. Pickup of CR602 unlocks the second level timer which thereupon starts the second level interval. At the end of this interval CR603 and CR604 both pick up. CR604, as previously indicated, applies power to the motor via contacts CR604A (FIG. 14b). Pickup of CR603 unlocks the third level timer which thereupon initiates the third level time interval.

As can be seen in FIG. 3 the pickup of CR603 switches from second level current command to third level current command via contacts CR603C and CR603D.

At this point the current command is changed from upslope operation to current level operation and, accordingly, the slope relay CR614 is caused to drop out via the opening of contacts CR603A (FIG. 5b). Relay contacts CR614A and CR614B, as shown in FIG. 9b, now go back to the illustrated position whereby the slope capacitor C640 is no longer connected to the current command generator output and the current level commanded by the program card resistor is connected to the current level generator output at TP11 as previously indicated. At this time the third level current is in command.

At the end of the third level time period SCR604 fires to pick up relay CR605 (FIG. 5c) and cause several things to happen. First, the commanded current level is changed to the fourth level via contacts CR605A and B, see FIG. 3. The upslope circuit is opened by opening CR605C in the emitter circuit of upslope rate generator Q630 (FIG. 9b). The fourth level timer is unlocked and its timing initiated. Capacitor C640 is charged rapidly through closed contacts CR607A, now closed contacts CR605D, resistor R666 and the emitter collector circuit of Q628 and resistor R622. Thus the capacitor is now being charged rapidly through a low resistance path to a value sufficient to initiate the ensuing downslope.

During this fourth level time with current commanded at the fourth level, the second complete pass around the workpiece may be achieved. At the end of the fourth level time delay, CR607 is picked up through firing of SCR605 of the fourth level timer and closing contacts CR605F. Now CR614 picks up once more via the closure of contacts CR607A and the current circuit of FIG. 9 again becomes a slope circuit. Thus CR614A and B open and close respectively and C640 which had rapidly charged at the beginning of the fourth level time delay is now linearly discharged through the downslope rate generator comprised of NPN transistor Q632 which has its base clamped by Q631 to thereby act as a constant current generator. This downslope rate constant current generator passes a current through R673 and CR607B, now closed, through the downslope rate program resistor to negative 15 volt d.c., thus linearly discharging the capacitor C640. The voltage on the latter is now connected via CR614B to the base of emitter follower Q633 and accordingly appears at the current command generator output TP11. It may be noted that capacitor C640, which at the beginning of the fourth level timer had rapidly charged to the fourth level current, had stored the fourth level command signal during the downslope since contacts 607A in the capacitor charging circuit were open at the end of the fourth level timer period. Thus the capacitor discharges from fourth level current during downslope.

Toward the end of the downslope time interval, one of two possible conditions may occur to terminate the program. If the downslope time interval terminates while the system is still operating, CR608, the final stop relay, picks up by firing of SCR606 (FIG. 5c) of the downslope timer 70. This opens CR608A, see FIG. 5a, whereby CR601 drops out and all is stopped. When CR601 drops out the 28 volt d.c. is removed from all relays by opening of contacts CR601b, the motor stops, relays are reset, the main contactor 101 drops out and the arc is extinguished.

It is possible, however, that before the end of the downslope time, the current through the arc will drop to a level below the threshold of the current sensing circuit of FIG. 8. If this should occur, Q619 decreases conduction to cause CR611, the current sensing relay, to drop out. When CR611 drops out, CR613, the automatic reset relay, is picked up, see FIG. 5b. This opens contacts CR613A (FIG. 5a) which provides the same results as opening of contacts CR608A to produce a final stop.

PULSE WIDTH MODULATOR

Figure 10A:
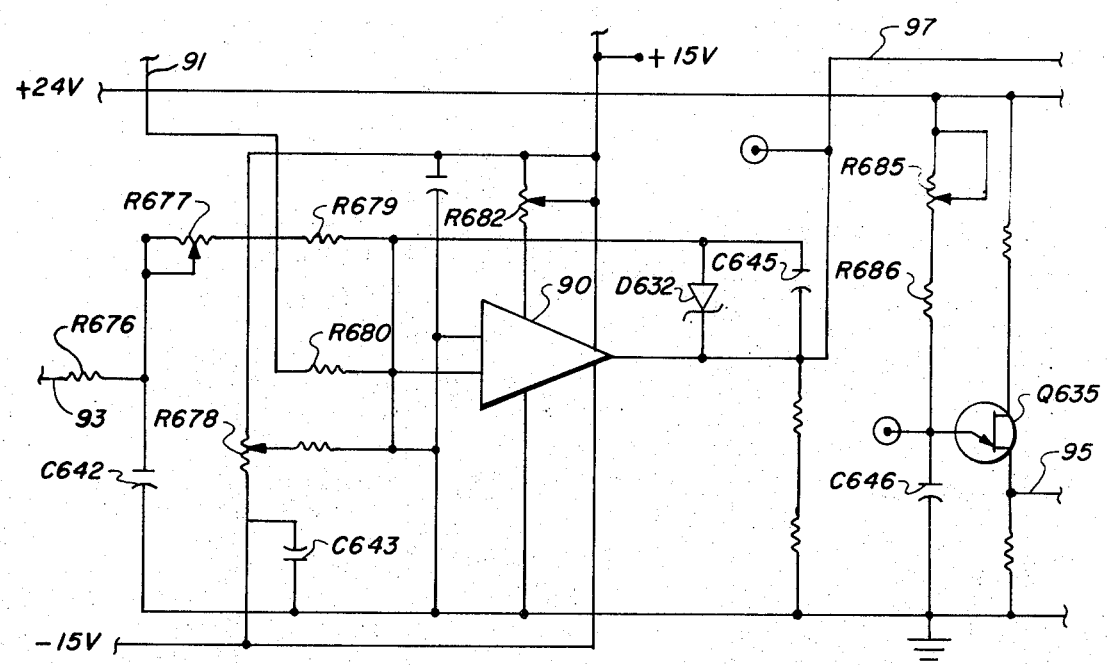
FIGS. 10a and 10b illustrate the circuitry of the pulse width modulator including the integrating error amplifier, relaxation oscillator, ramp generator and amplitude comparator of the disclosed embodiment.
Figure 10B:
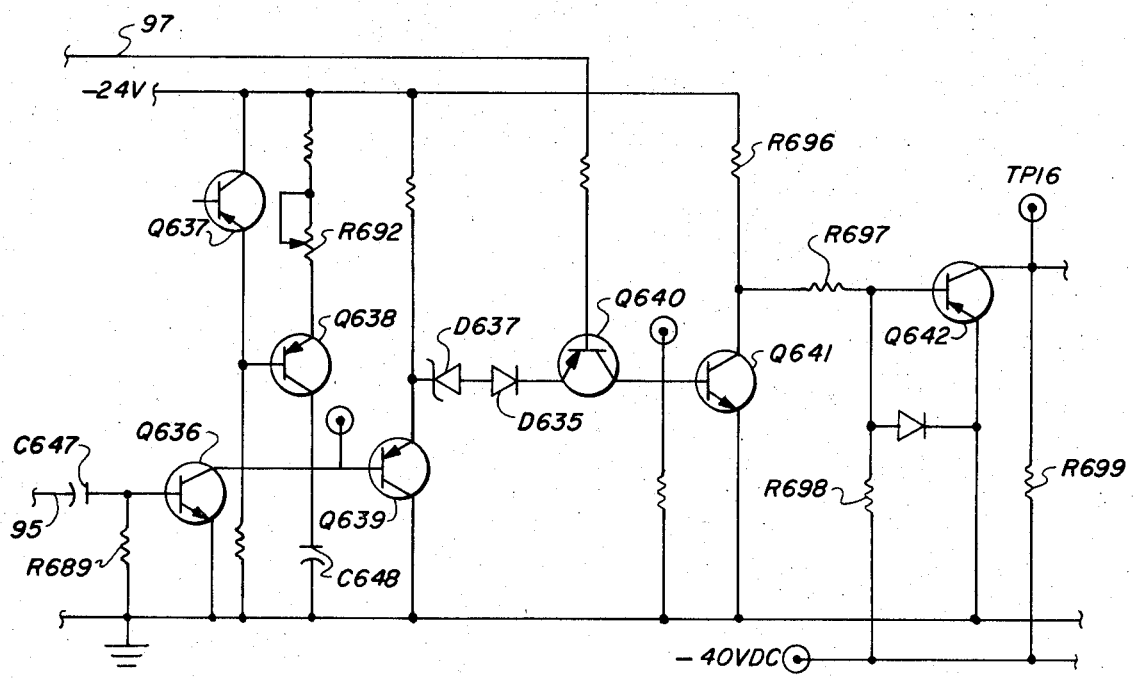

The pulse width modulator is shown in detail in FIGS. 10a and 10b. FIGS. 10a and 10b form a single circuit when FIG. 10b is located horizontally aligned with and to the right of FIG. 10a. The modulator receives the output of an error amplifier 90 and provides a series of variable width pulses, having a duty cycle proportional to the commanded current, to the switch drivers 30a through 30e of the power switches 32a through e (FIG. 1). The pulses are provided at a preselected repetition rate, such as, for example, 5,000 pulses per second. Each power switch supplies negative 40 volts d.c. to the load of the arc for a period of time equal to the driving pulse width. Switching transients are removed by inductance in the output of each switch. The error amplifier 90 provides an output indicative of the difference between the commanded current level from TP11 and a feedback current provided by a standard meter shunt 92 which is located in the weld current path (see FIG. 8). The feedback signal is obtained from the standard meter shunt and provided on lead 91 via an input resistor R680. A second input to the amplifier is provided on lead 93 from the emitter of Q634 (TP11, FIG. 9b) through a coupling resistor R676 and a potentiometer R677 to the amplifier input. The resistors R680, R677 and R679 comprise summing resistors whereby the output of the amplifier is proportional to the difference of the inputs thereto.

The amplifier 90 is a standard high gain d.c. operational amplifier used as a summer integrator to develop a signal proportional to the actual desired current. The gain of the amplifier 90 is a function of the input resistor R676 which is connected to the emitter of the current command generator Q634. The input resistance also includes R677 which is adjustable and R679 which provide the command signal input to the amplifier. The input resistor for the feedback signal is R680. A capacitor C645 is placed around the operational amplifier connected between its output and input to provide integration. The capacitor provides an exceedingly high d.c. gain and yet has a lower transient gain. It also operates to filter electrical noise from the system. A zenor diode D632 is also placed across the amplifier output to limit the output voltage to a range of 0 to 10 volts. Variable resistors R682 and R678 are provided to eliminate the voltage offset and current offset during adjustment and calibration of the system.

The pulse width modulator includes a relaxation oscillator comprising a capacitor C646 which is charged from 24 volt d.c. via a potentiometer R685 and resistor R686 to attain a potential sufficient to cause a uni-junction transistor Q635 to fire. When the latter fires it provides at its output on lead 95 a positive pulse which is differentiated by a capacitor C647 and resistor R689 to provide a sharp pulse to the base of a transistor Q636 which is momentarily caused to conduct. A second part of the pulse width modulator is formed by a linear ramp generator that is controlled by the relaxation oscillator. A constant current generator formed by Q638 and Q637 linearly charges a capacitor C648 which is periodically discharged at the repetition rate of the relaxation oscillator by the periodic and momentary conduction of Q636. The latter upon receipt of a trigger from the RC network R689, C647, momentarily conducts to provide a discharge path from the capacitor to ground.

As can be seen in the synchrograph of FIG. 11a the emitter voltage of the uni-junction transistor Q635 charges as indicated at 89 to a voltage sufficient to fire the transistor which immediately discharges the relaxation oscillator capacitor to rapidly and abruptly drop the emitter voltage. In synchronism with the emitter voltage buildup, the linear charging of capacitor C648 is achieved as indicated by waveform 99. Upon the abrupt termination of the emitter voltage and the conduction of Q636 the ramp voltage on the capacitor also abruptly terminates.

The charging rate of C648 and therefore the peak voltage to which it charges in one cycle is controlled by a potentiometer R692. An emitter follower transistor Q639, is provided to minimize loading on the capacitor circuit due to the following stages. The frequency of its waveform obviously will be the same as that of the uni-junction relaxation oscillator.

The next section of the circuit is, in effect, an amplitude comparator where pulse width modulation actually occurs. This is achieve by a transistor Q640 that operates to compare the voltage on its base with the voltage on its emitter. Whenever the voltage on the base of the Q640 is less than the emitter voltage, the transistor turns on and in turn causes conduction of Q641 which has the base thereof connected with the collector of Q640. The voltage on emitter of Q639 is coupled to the emitter of Q640 by means of a zenor diode D637 and a diode D635 which operate to limit the pulse width to 80 percent. The voltage on the base of Q640 is derived via lead 97 from the output of error amplifier 90 and is illustrated as a flat unvarying voltage 94 in FIG. 11c. At the initiation of the ramp, assuming a level of voltage 94 greater than the lowest ramp voltage, the transistor Q640 is initially cut off. As the ramp voltage increases to a value greater than the output voltage of the error amplifier, the emitter voltage is greater than the base voltage, the transistor Q640 conducts and remains in conduction until the termination of the ramp voltage at which time Q640 is cut off. As the ramp voltages increase to a value greater than the output voltage of the amplifier, the transistor Q640 conducts and remains in conduction until the termination of the ramp voltage at which time Q640 is cut off.

When the collector of Q640 goes positive, the transistor conducting via zenor diode D637 and diode D635, the base of Q641 goes positive and this transistor conducts. The collector of Q641, which is connected to negative 40 volts via relatively large resistors R697 and R698 and to +24V via a relatively small resistor R696, is held positive normally. When Q641 conducts the collector goes from its normal positive level to ground by virtue of the low collector emitter voltage drop across Q641. When the collector of Q641 goes to ground, a negative going signal appears at the base of a normally non-conducting transistor Q642 which has its collector connected to the negative 40 volt source via R699 and has its emitter connected to ground. Q642 therefore conducts and the voltage at TP16, the collector of Q642, goes from negative 40 volt level to common. Thus the voltage at TP16 is normally at −40V (Q640 is off) until the ramp rises to a point where it is greater than the commanded signal level of the amplifier output. Q640 then conducts and TP16 then rises to common or ground for the remaining period of the relaxation oscillator. During the interval T1, (FIG. 11d) when Q640 is off, the power switch is off and during T2, the subsequent positive pulse at the TP16, the power switch is on.

POWER SWITCH

Figure 7:
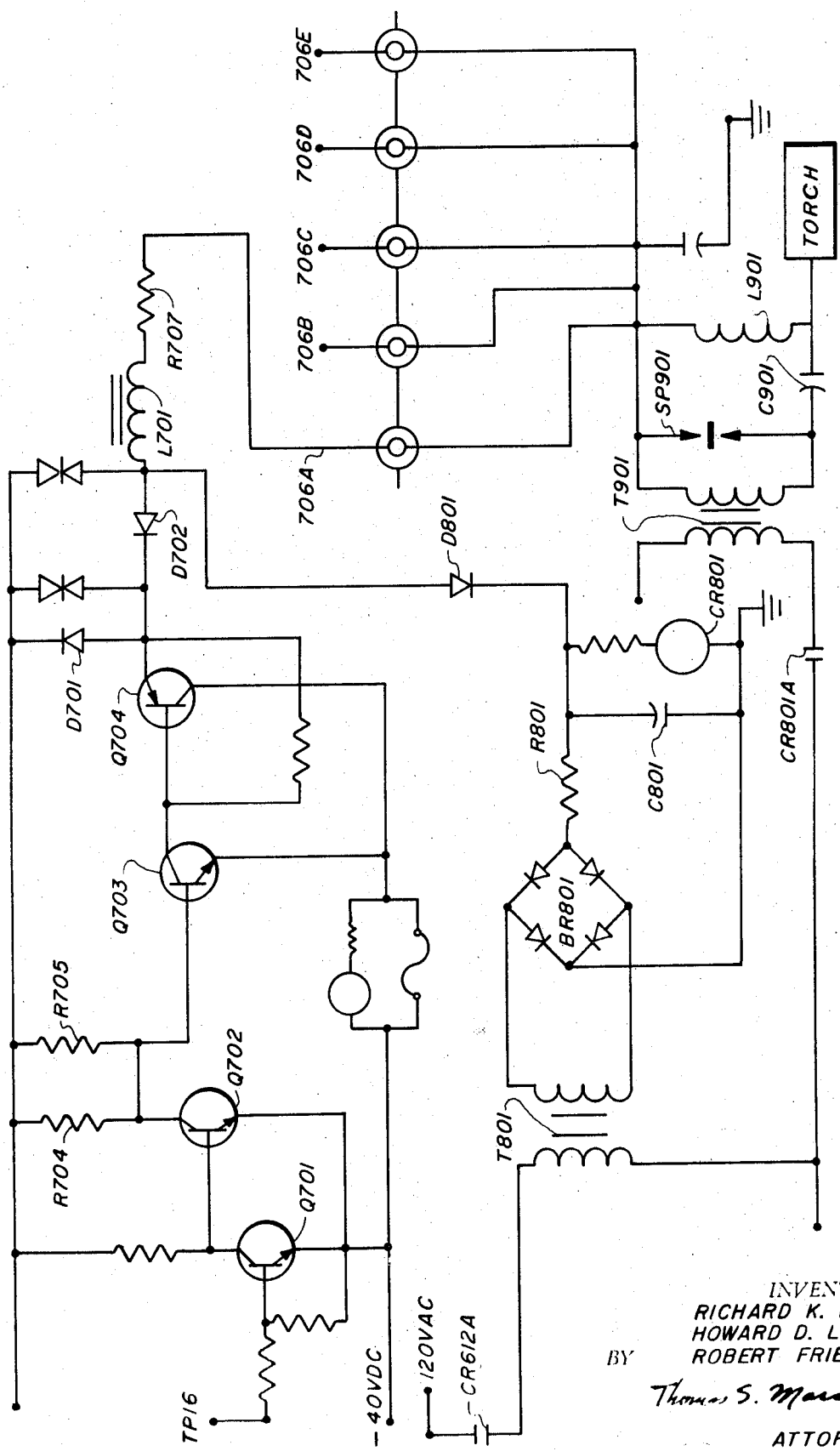
FIG. 7 illustrates the power switch impulse module and high frequency module for driving the weld arc.

The output of the pulse width modulator at TP16 is fed to a series of power switch drivers and to the final power switch itself as illustrated in FIG. 7. The switch drivers each comprise three stages of amplification formed by transistors Q701, Q702 and Q703 which drive the power switch transistor Q704. When the input voltage at TP16 is −40 volts, the power switch is off. Q701 is off which in turn, turns on the Q702. Conduction of Q702 turns off Q703 which in turn maintains Q704 in nonconduction. The power switch Q704 has its collector coupled with the negative 40 volt d.c. welding current supply and its emitter connected via diode D702, inductor L701 and resistor R707 to the weld torch as illustrated in FIG. 7.

When the input voltage to the switch driver at TP16 is at common or high, then Q701 is caused to conduct, Q702 is cut off and Q703 now turns on by means of the voltage provided by R704 and R705, connected to its base. This causes conduction of Q704 which places the negative 40 volt d.c. across the welding arc and the choke coil L701.

In the inductor L701, as is well known, current builds up exponentially with time and is a function of the voltage applied and the resistance in series with the inductor. The value of the inductor is chosen to have a time constant many times larger than the period of the 5,000 pulses per second natural frequency of the relaxation oscillator of FIG. 10. Therefore for any "on" period the actual change in current to the weld is small. When transistor Q703, the final stage of the driving transistor, is turned off, the current through the inductor goes through a ringing diode D701.

It will be understood that the power switch and power switch drivers of the transistors Q701 − 704 comprise a single one of the power switch modules illustrated in FIG. 1. Where five switch and switch drivers are provided as illustrated in FIG. 1, there will be four additional circuits, each identical to that of the power switch driver and switching transistors of Q701 − 704 and each will have an input at the terminal identical to terminal TP16 from the common pulse width modulator output. Each switch will have an output to a different one of torch input terminals 706A–706E respectively.

It will be readily appreciated that this mode of control of a power supply, employing a transistor in a switching mode from completely on to completely off, enables use of transistors in a much higher range of power dissipation. Where prior transistorized control circuits have employed linearly controlled transistors, power dissipation considerations greatly limit the current handling capability of each transistor and accordingly prior art arrangements have been forced to employ a large number of transistors in parallel to share the load and thus minimize the load carried by each. However, where as in the instant invention, the power transistor, such as Q704, is operated between the full-on or full-off condition, that is, between a low voltage, high current or high voltage, low current condition, it switches rapidly through the area of high power dissipation and thus is enabled to handle considerably greater loads. Of course, with the described arrangement of power switching, a power switch control is necessary and for this reason, the above described linearly controlled pulse width modulation has been provided. Accordingly the switching transistors are caused to have a duty cycle that is directly and precisely related to the level of the commanded voltage provided at the output of the amplifier 90.

The modular transistorized power supply units are each conservatively rated to allow for full output in the event that one of the units should fail. For example, in an operating embodiment each modular unit is rated at 20 amperes although each is actually capable of handling 30 amperes. Further, if deemed necessary or desirable to protect the circuitry, each power switch module may include its own current limiting circuit (not shown).

A particular advantage of the transistorized switching system arises by virtue of relatively high switching rate, namely 5 k.c., in a preferred embodiment, for example. With such a high repetition rate and the use of the indicated smoothing inductance L701 in each module, there is almost total freedom from current ripple. This freedom from current ripple in turn provides an unexpected advantage, enabling a much improved closed loop current control-system. Thus, the standard shunt 92 (FIG. 8), which is in effect a low resistance series connected in the current line and having a voltage drop of about 100 millivolts thereacross, provides a feedback signal to amplifier 90 (FIG. 10a) which is instantaneously compared with the commanded current level for control of the pulse width modulator and, accordingly, for instantaneous control of the weld current level. With other switching devices such as magnetic amplifiers or silicon control rectifiers which are normally switched at the 120 cycle frequency of the usual line voltage, there is a significant amount of ripple in the weld current which is unacceptable in certain conditions and, further, which requires integration of several cycles for generation of an accurate feedback signal for closed loop operations. Thus in such prior systems the speed of the closed loop control is significantly compromised, where precision weld current control is available in the described arrangement.

MOTOR SPEED CONTROL

Figure 13:
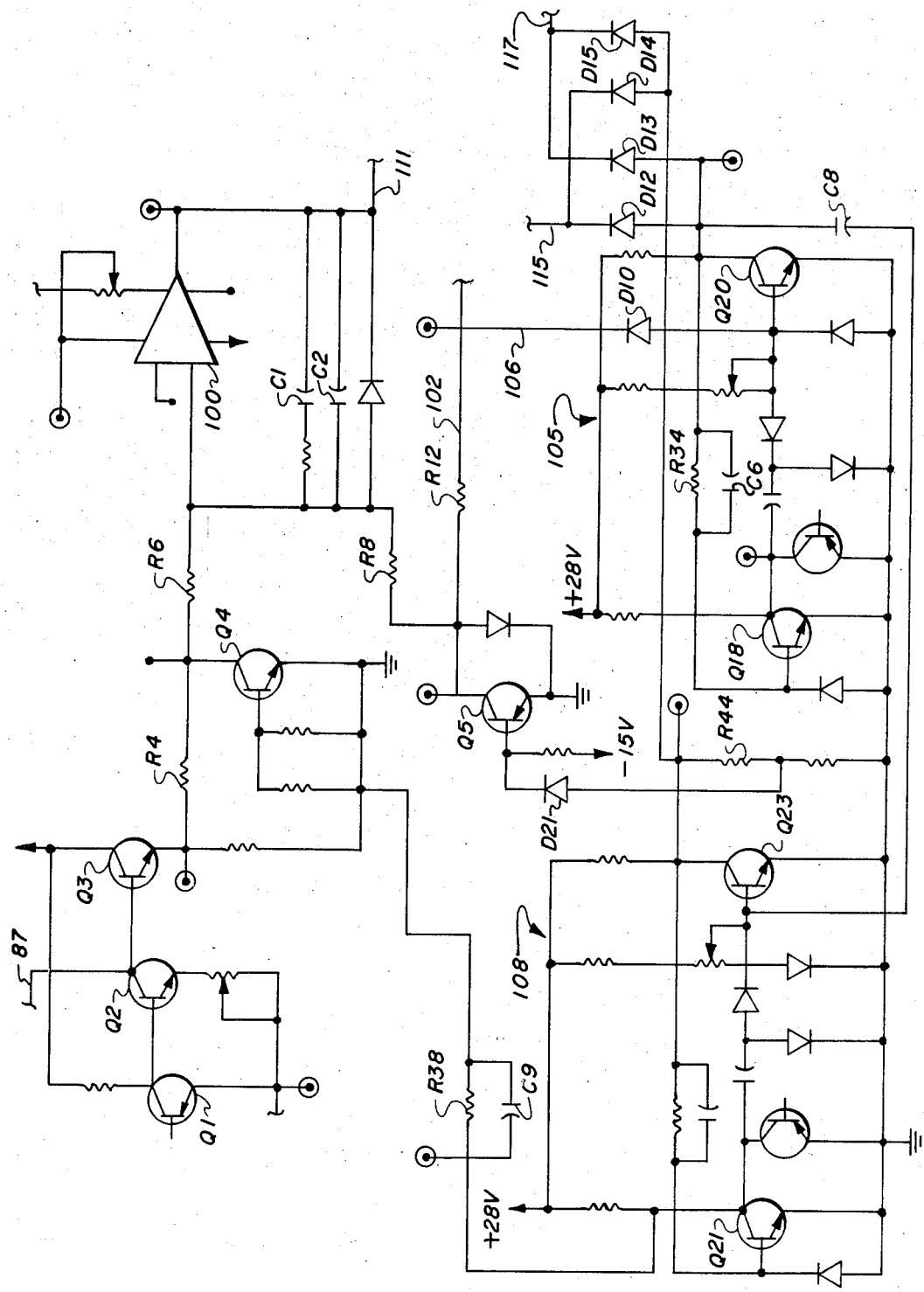
FIGS. 13, 14a and 14b comprises a circuit diagram of motor speed control.

Referring now to FIGS. 13, 14 and 15, it will be seen that the motor speed command is generated in a similar manner to the generation of the current command. Transistors Q1 and Q2 comprise a constant current generator similar to those previously described and conduct the current at a level determined by the chosen program card resistor 50k which is connected via lead 87 to the collector of transistor Q2. Current output at the collector of Q2, which is linearly related to the program card resistor, if fed through an emitter follower transistor Q3 to an error amplifier 100 having a pair of summing resistor networks which provide an error signal to the amplifier. The command signal summing resistors are provided by R4 and R6 which are connected between the emitter of Q3 and the amplifier input. A feedback signal representing motor speed is derived on line 102 and is fed through summing resistors R12 and R8 to the amplifier input which thereby receives an input signal representing the difference between the commanded and the feedback speed levels.

The error signal at the output of the error amplifier 100 is employed to control the amplitude comparator of a pulse width modulator that is substantially similar to that described in connection with FIG. 10. This pulse width modulator (FIG. 14a) employs a relaxation oscillator which charges a capacitor C3 through resistors R14 and R15. As before, the charge on the capacitor is a rising voltage, indicated in FIG. 15A, which is fed to the emitter of uni-junction transistor Q7 to fire the transistor at the end of the predetermined time interval. Again a constant current generator comprising Q9 and Q10 is employed to linearly charge a second capacitor C5 to provide the linear ramp voltage on the capacitor C5 as indicated in FIG. 15B. The output of the uni-junction transistor Q7 as differentiated by capacitor C4 and resistor R20 to momentarily fire a transistor Q8 which, as previously described, discharges the capacitor C5 to abruptly terminate the ramp voltage. The ramp voltage is fed through an emitter follower stage Q12 to the emitter of a comparator transistor Q13. The latter has a base electrode which receives via R26 the error voltage output from the error amplifier 100 on lead 111.

The modulated pulse having a width proportional to the error signal appears at the collector of Q13 and is fed through a stage of amplification provided by Q14 and thence through a zenor diode D4 and via lead 113 to a pair of additional amplifier stages Q15 and Q16 (FIG. 14b). The zenor diode D4 is employed to convert from a positive to a negative voltage. It will be seen that when TP8, at the collector of Q14, is at ground, the diode is non-conducting and the base of Q15 is held at negative 40 volts through the contacts CR604A which are, of course, closed for operation of the motor as previously described. With the base of Q15 negative Q16 is cut off. The collector of Q16 is connected to the base of a power transistor Q17 which is thus turned on to apply −40 volt power to the motor 112. When TP8 goes positive, that is, when Q13 and Q14 are cut off, the reverse takes place. Diode D4 conducts, lesser voltage on the order of negative 25 volts, is placed on the base of Q15 which turns on Q16, turning off Q17, and therefore turning off power to the motor.

The rate feedback signal is derived via a resistor R46 which is in series with the motor driving winding. If deemed necessary or desirable, this resistor may be made variable or adjustable to permit calibration of the motor and eliminate the effect of varying back e.m.f. from motor to motor. With this adjustment any particular motor could be calibrated for use in the system.

It may be noted that the motor preferred is of the 28 volt d.c. variety. A maximum duty cycle of 60 percent is provided by the circuitry whereby the average voltage on the motor is limited to 24 volts. This prevents the motor from burning out due to excess power dissipation.

The driving coil of the motor is effectively an inductive load. Since it is inductive, its current cannot change instantaneously and therefore the voltage across the motor winding momentarily goes negative (FIG. 15e) when Q17 is turned off. After this opposite polarity inductive spike, the motor continues to coast and develops a back e.m.f. indicated at 102 in FIG. 15e. The level of the back e.m.f. is directly related to the motor speed and is conveniently picked off by the feedback resistor R46 and fed as one of the inputs to the error amplifier as a rate feedback signal.

It will be readily appreciated that the error comparison, that is, comparison of the back e.m.f. or rate signal with the command signal cannot take place during the drive pulse and, further, must wait decay of the transient spike. Accordingly switching circuits are employed to provide appropriate timing intervals, all synchronized with the relaxation oscillator. These circuits achieve a sampling of the feedback rate signal, a sampling of the command signal, and a holding or storage of the error signal for use during a subsequent time when the pulse width modulator is to be commanded by this error signal. In effect, for each cycle of the pulse width modulator there is a series of occurrences which include, first, awaiting decay of the transient which occurs upon removal of the drive voltage to the motor coil, a short sampling period in which the rate feedback signal and command signal are sampled, compared and stored, and then initiation of the next cycle of the relaxation oscillator and control of the pulse of the pulse width modulator during which latter period the sampling circuits are disabled.

The sampling circuit timing is provided by two one-shot multivibrators 105, 108 (FIG. 13) of substantially identical configuration. Multi-vibrator 105 comprises a pair of cross-coupled transistors Q18 and Q20. Timing of the multi-vibrator is provided in part by the parallel RC network R34, C6 interconnecting the collector of Q20 and the base of Q18. This multi-vibrator 105 is triggered by the firing of the uni-junction transistor Q7 by means of a connecting lead 106 to the capacitor C3 (FIG. 14a) of the relaxation oscillator circuit. Thus, upon discharge of the capacitor C3 through resistor R16, uni-junction transistor Q7 and R19 a signal is fed via a diode D10 to the base of transistor Q20 of the one-shot. The output of this one-shot, which may be a delay pulse on the order of 700 microseconds (FIG. 15c), is provided at the collector of Q20 and is fed via a capacitor C8 to the base of transistor Q23 of a second one-shot multi-vibrator 108 of which the second of its pair of cross-coupled transistors is provided by transistor Q21. This one-shot, having a smaller delay period, has an output at the collector of Q23 as illustrated in FIG. 15d.

In order to turn on and off the command voltage and the rate feedback voltage and provide sampling thereof, an NPN transistor Q4 is connected between the input summing resistors R4 and R6 and ground, and a second sampling or switching transistor Q5, which is a PNP transistor, is connected between ground and the feedback summing resistors R8 and R12. Each of these transistors is arranged to be normally conducting whereby the command signal and rate feedback signal are respectively shunted to ground and the error input to the amplifier is held at zero. When the second one-shot multi-vibrator 108 fires, a negative pulse is provided at the collector of Q21 and fed by a parallel RC network, R38, C9, to the base of Q4 which is accordingly turned off. Concomitantly a positive pulse on the collector of Q23 of the second one-shot is fed via R44 and a diode D21 to the base of PNP transistor Q5 which also is turned off. When Q4 and Q5 are turned off, the command and rate signals are no longer disabled. They are compared and fed to the error amplifier 100 and sampling occurs. The error signal at the input to the amplifier 100 is fed also to storage capacitors C1 and C2 connected between the amplifier input and output which thereby hold the error signal for the subsequent control of the pulse width modulation. The sampled command and feedback signals occurring during the sampling interval are illustrated in FIGS. 15f and 15g.

During the sampling, it is necessary to turn off the pulse width modulator and the relaxation oscillator. Accordingly disabling signals are provided from both one-shot multi-vibrators 105 and 108 to achieve this end. A pair of transistors Q6 and Q11 (FIG. 14a) are added respectively to the relaxation oscillator and to the ramp generator portions of the pulse width modulator to inhibit the pulse width modulator from operation during sampling intervals. Q6 holds the voltage on the timing capacitor C3 at ground level and Q11 holds the voltage on the ramp capacitor C5 at ground level during the interval of both multi-vibrators 105 and 108. This also prevents Q13 from turning on and thereby keeps voltage from the motor winding during this time.

The output of multi-vibrator 105 at the collector of Q20 is fed to the base of transistors Q6 and Q11 respectively via leads 115, 117 and diodes D12 and D13, and the output of the second multi-vibrator 108 at the collector of Q23 is fed to the bases of these transistors Q6 and Q11 via leads 115, 117 and diodes D14 and D15 respectively. Accordingly during the periods of both one-shot multi-vibrators, both Q6 and Q11 are conducting to hold the uni-junction transistor emitter electrode and the collector of Q10 at ground. At the end of the two delay periods the ramp is again initiated to generate a pulse from the pulse width modulator having a width proportional to the error signal stored on capacitors C1 and C2.

A particular advantage of the described motor speed control derives from its adaptability to use in a high gain, closed loop system which enables a greater precision of speed control. Tight regulation of motor speed in precision welding, as in other applications, is of particular importance since, as is readily understood, if a welding electrode is driven too fast, for example, the equivalent of a decrease in current level occurs.

The embodiment described above is specifically adapted for tungsten inert gas welding of pipe employing an orbit arc welder. It will be readily appreciated, however, that the described system may be employed for other types of arc welding, for workpieces of other configurations, for metal inert gas welding, for welding traverses of workpieces of different thicknesses or differing configurations, or for portable or stationary equipment, all of which would advantageously make use of the simplified operation, almost wholly free of operator error, providing improved current regulation and smoother current, wherein any one of a number of different programs for the desired welding operation may be selected at the work station simply by selecting a given program card.

The illustrated logical control may be achieved by other types of switching devices, diodes, transistors, or micro-miniature semi-conductor devices and circuits or equivalents. So too, the described transistor circuits may be implemented by micro-miniature circuitry as will readily be appreciated to those skilled in the art.

Furthermore, it will be seen that the program control employing interchangeable groups of program resistors with parameter-generating circuits, each controlled by a single one of these resistors, may be readily adapted to systems other than welding systems wherein various parameters and timing are to be controlled in accordance with a pre-determined sequence of operation. Thus the overall system concept of the described embodiment employing programmed parameter control together with the various subsystems thereof, each may be applied to perform functions other than those particularized in the above description and each, whether the overall program system or subcomponents, may be varied in form or detail to accomplish the described results in modified fashion.

What is claimed is:

1. A pulse width modulator for providing a train of output pulses at a selected repetition rate and with a selected duty cycle, comprising:
   a control signal;
   means for generating a repetitive ramp signal;
   a comparator responsive to the control signal and to the ramp signal for producing an output pulse that is initiated when said ramp signal attains a magnitude having a predetermined relation to the control signal and that terminates upon termination of the ramp signal;
   a source of welding current;
   a plurality of switches arranged to connect and disconnect the current source to and from a weld head; and
   means responsive to the output of said comparator for repetitively operating said switches at a duty cycle represented by said control signal.

2. A programable control system including means to regulate the current supplied to a welding torch, said apparatus comprising:
   a welding torch,
   a source of welding supply current,
   a source of program voltage,
   a plurality of signal circuits for generating output signals for application in controlling functions of said welding torch including current command generating circuits and timing circuits operable to generate current command output signals and first and second timing output signals respectively, each of said current command generating and timing circuits having therein a resistor which provides electrical communication between said current command generating and timing circuits and said source of program voltage, each of said timing circuits controlling a time interval having a value dependent upon the value of its said resistor;

a logic circuit in electrical communication with said signal circuits including a first output signal operable to control the operation of said timing circuits and a second output signal responsive to said first output signal of said timing circuits operable to control said current command generating circuits;

an error comparator for generating an output signal;

means responsive to the second output signal of said timing circuits and to said second output signal of said logic circuits for generating a signal for input to said error comparator;

a group of modulator transistor switches for providing electrical communication between said source of welding supply current and said welding torch;

a pulse width modulator responsive to the output signal of said error comparator and operable to control the operation of said switches and thereby control the current supplied to the welding torch;

means for providing as a second input to said error comparator, a signal representing welding current.

3. The control system of claim 2 wherein one of said signal circuits includes a motor speed control circuit and further including:

a motor for driving a workpiece relative to the welding torch;

a pulse width modulator for energizing the motor with a series of motor driving pulses;

means for deriving a motor speed feedback signal during intervals between said motor driving pulses;

means for sampling the feedback signal and the signal generated by the motor speed command signal circuit;

means for comparing said sampled signals and storing the comparison;

means for disabling the last mentioned pulse width modulator during the sampling time; and means for controlling the last mentioned pulse width modulator in accordance with the stored comparison signals.

4. A program control system according to claim 3 including means for starting a welding arc, said starting means comprising:

a high frequency starter for ionizing inert welding gas and a high frequency impulse starter responsive to ionization of said gas for providing a high current pulse through the ionized gas and through the welding arc.

5. A variable signal generating circuit comprising:

a level control circuit for generating level signals having predetermined values;

a capacitor for generating a varying signal;

first constant current means in electrical communication with said capacitor and operable to charge said capacitor to the level of one of said level signals in electrical communication with said capacitor;

means for rapidly charging said capacitor to the level of a second one of said level signals;

second constant current means in electrical communication with said capacitor for discharging said capacitor;

an output terminal;

logic means for selectively coupling the first and second constant current generating means to the level control circuit and to the means for rapidly charging, said logic means including means for selectively coupling to said output terminal selected ones of said level signals and said varying signal;

a plurality of groups of circuit elements;

a program control means for selecting one of said groups;

switch means for selectively connecting different ones of the elements of the selected group into said level control circuit to determine the value of the signal generated thereby;

a welding torch;

a current supply for the torch;

a power switch for selectively connecting the torch with the current supply;

a pulse width modulator responsive to signals on said output terminal for operating said power switch.

6. A welding power supply comprising:

a source of welding current;

a plurality of transistors each detachably connected in series between the current source and a welding electrode, said transistors being connected in parallel with each other; and means for repetitively switching at least some of said transistors together between a first state of substantially full conduction and a second state of substantially no conduction, whereby the current to the welding electrode may be varied in increments by connecting a selective combination consisting of at least one of said transistors, and said transistors, when connected, operate only in a low voltage-high current state or high voltage-low current state to minimize power dissipation.

7. The power supply of claim 6 including means for varying the time in which said transistors are maintained in said first state, whereby the current to the welding electrode may be varied in addition to or in lieu of said incremental variation.

8. The power supply of claim 6 including:

closed loop control means for generating an error signal indicative of the difference between a commanded current and current drawn by said welding electrode; and said means for repetitively switching comprising means responsive to the closed loop control means for operating the transistors in accordance with said error signal.

9. The power supply of claim 6 wherein said means for repetitively switching comprises:

a pulse width modulator connected to control the duty cycle of said transistors; and closed loop control means for selectively controlling the duration of pulses produced by the pulse width modulator.

10. The welding supply of claim 6 including:

an inductor in series with said transistors to minimize fluctuation of the repetitively switched current fed to the electrode;

means to provide a feedback signal representative of weld current;

a command signal;

a comparator for generating an error signal indicative of the difference between said command and feedback signals; and a pulse width modulator responsive to said error signal for controlling the time during which said transistors are maintained in said first state.

11. A welding power supply comprising:
a current supply;
a welding torch; and
means for varying current from the supply to the torch in predetermined discrete increments and linearly with respect to a commanded level within said increments, said varying means comprising:
a plurality of bi-state devices detachably connected between said supply and torch, and a pulse width modulator connected to operate all of said devices with a duty cycle in accordance with said commanded level.

12. The power supply of claim 11 wherein the pulse width modulator comprises:
an oscillator;
a capacitor;
a constant current generator connected to linearly charge the capacitor;
means responsive to the oscillator for repetitively discharging the capacitor;
a source of command signal;
a modulator comparator having first and second inputs thereof connected to receive a signal from said capacitor and an error signal;
a weld current circuit providing a feedback signal representative of welding current, said circuit having included therein a resistor;
an error comparator responsive to said feedback and command signals for generating said error signal;
whereby the modulator comparator provides an output pulse that is initiated upon attainment of a predetermined relation between the inputs to the modulator comparator and that is terminated upon discharge of the capacitor by said oscillator; and
means for driving all of said devices in accordance with the output pulses from said modulator comparator.

13. A modular power supply comprising:
a plurality of power supply units;
a welding torch; and
means for detachably connecting a combination consisting of at least one of said power supply units in parallel to said torch;
each said unit comprising:
a power switch, an inductor connected between the switch and the unit output, and a switch driving circuit for operating the switch in response to a current command signal; and
command means for applying a common current command signal to all of said driving circuits in unison.

14. The power supply of claim 13 wherein said command means comprises:
an oscillator;
a capacitor in electrical communication with said oscillator;
a constant current generator connected to linearly charge the capacitor;
a source of command signal;
a modulator comparator having first and second inputs thereof connected to receive a signal from said capacitor and an error signal;
a resistor in electrical communication with the current supplied to said welding torch for generating a feedback signal indicative of welding current;
an error comparator responsive to said feedback and command signals for generating said error signal;
whereby the modulator comparator provides an output pulse that is initiated upon attainment of a predetermined relation between the inputs to the modulator comparator and that is terminated upon discharge of the capacitor by said oscillator; and
means for controlling said driving circuits in accordance with the output pulses from said modulator comparator.

15. A closed loop welding power supply comprising:
a source of welding current;
a welding torch;
a switch electrically interposed between the source of welding current and the torch;
means for generating a feedback signal indicative of current through the torch;
a source of current command signal; and
means responsive to said feedback and current command signals for repetitively operating said switch between states of conduction and nonconduction at a controlled duty cycle.

16. The power supply of claim 15 wherein said source provides direct current, said last mentioned means comprises a comparator for generating an error signal indicative of the difference between the current command and feedback signals, a pulse width modulator responsive to the comparator for producing a train of pulses, each having a duration in accordance with said error signal, and means for operating the switch in accordance with the pulses of said train of pulses.

* * * * *